(12) United States Patent
Jeong et al.

(10) Patent No.: US 12,484,076 B2
(45) Date of Patent: Nov. 25, 2025

(54) METHOD AND APPARATUS FOR OPERATION UPON RLF DETECTION IN SL CA

(71) Applicant: Samsung Electronics Co., Ltd., Suwon-si (KR)

(72) Inventors: Kyeongin Jeong, Allen, TX (US); Shiyang Leng, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 18/321,648

(22) Filed: May 22, 2023

(65) Prior Publication Data

US 2023/0397231 A1 Dec. 7, 2023

Related U.S. Application Data

(60) Provisional application No. 63/347,881, filed on Jun. 1, 2022, provisional application No. 63/348,837, filed on Jun. 3, 2022.

(51) Int. Cl.
*H04W 4/00* (2018.01)
*H04L 1/1812* (2023.01)
(Continued)

(52) U.S. Cl.
CPC ........... *H04W 72/25* (2023.01); *H04L 1/1812* (2013.01); *H04L 5/001* (2013.01)

(58) Field of Classification Search
CPC ..... H04W 72/25; H04W 76/38; H04W 72/40; H04W 72/23; H04W 72/231;
(Continued)

(56) References Cited

U.S. PATENT DOCUMENTS 10,827,380 B2 * 11/2020 Rao .................. H04W 28/0268
11,658,790 B2 * 5/2023 Hosseini ............... H04L 1/1896
370/329

(Continued)

FOREIGN PATENT DOCUMENTS

| CN | 110999449 A | 4/2020 |
| WO | 2019023857 A1 | 2/2019 |
| WO | 2019090605 A1 | 5/2019 |

OTHER PUBLICATIONS

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

(Continued)

*Primary Examiner* — Phuongchau Ba Nguyen

(57) ABSTRACT

Methods and apparatuses for an UE operation upon RLF detection in a SL CA in a wireless communication system. A method of operating a UE includes receiving, from a base station (BS), configuration information about multiple sidelink (SL) carriers for a SL carrier aggregation (CA) operation; when a hybrid automatic repeat request (HARQ) feedback corresponding to s SL carrier among the multiple SL carriers is not received for consecutive N times and the SL carrier is not a last configured SL carrier, releasing the SL carrier for a corresponding destination layer 2 identifier (L2 ID); and when the HARQ feedback corresponding to the SL carrier among the multiple SL carriers is not received for a consecutive M times and the SL carrier is the last configured SL carrier, releasing a PC5-radio resource control (PC5-RRC) connection for the corresponding destination L2 ID.

20 Claims, 14 Drawing Sheets

(51) Int. Cl.
*H04L 5/00* (2006.01)
*H04W 72/25* (2023.01)

(58) Field of Classification Search
CPC ..... H04W 76/18; H04W 76/30; H04W 28/04;
H04W 72/04; H04W 72/042; H04W
88/08; H04W 28/08; H04W 28/084;
H04W 36/22; H04W 72/01; H04L
1/1812; H04L 5/001; H04L 2001/0092;
H04L 5/0055; H04L 5/0091; H04L
5/0098; H04L 5/0007
See application file for complete search history.

(56) References Cited

U.S. PATENT DOCUMENTS

| 2021/0051653 | A1  | 2/2021 | Park et al.   |           |
|--------------|-----|--------|---------------|-----------|
| 2022/0053481 | A1  | 2/2022 | Akkarakaran et al. | |
| 2022/0191962 | A1* | 6/2022 | Di Girolamo   | H04W 76/19 |
| 2024/0015848 | A1* | 1/2024 | Jeong         | H04L 1/1812 |
| 2025/0016638 | A1* | 1/2025 | Wang          | H04W 76/14 |

OTHER PUBLICATIONS

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.
"5G; NR; NR and NG-RAN Overall description; Stage-2 (3GPP TS 38.300 version 17.0.0 Release 17)", ETSI TS 138 300 V17.0.0, May 2022, 207 pages.
"3rd Generation Partnership Project; Technical Specification Group Radio Access Network; NR; Study on NR Vehicle-to-Everything (V2X) (Release 16)", 3GPP TR 38.885 V16.0.0, Mar. 2019, 122 pages.
"Universal Mobile Telecommunications System (UMTS); LTE; Proximity-based services (ProSe); Stage 2 (3GPP TS 23.303 version 17.0.0 Release 17)", ETSI TS 123 303 V17.0.0, May 2022, 133 pages.
"5G; Architecture enhancements for 5G System (5GS) to support Vehicle-to-Everything (V2X) services (3GPP TS 23.287 version 17.2.0 Release 17)", ETSI TS 123 287 V17.2.0, May 2022, 62 pages.
International Search Report and Written Opinion issued Aug. 25, 2023 regarding International Application No. PCT/KR2023/007425, 7 pages.
Apple, "Introduction of sidelink relay", 3GPP TSG RAN WG2 Meeting #117 electronic, R2-2203946, Mar. 2022, 22 pages.

* cited by examiner

METHOD AND APPARATUS FOR OPERATION UPON RLF DETECTION IN SL CA

CROSS-REFERENCE TO RELATED APPLICATIONS AND CLAIM OF PRIORITY

The present application claims priority to U.S. Provisional Patent Application No. 63/347,881, filed on Jun. 1, 2022; and U.S. Provisional Patent Application No. 63/348,837, filed on Jun. 3, 2022. The contents of the above-identified patent documents are incorporated herein by reference.

TECHNICAL FIELD

The present disclosure relates generally to wireless communication systems and, more specifically, the present disclosure relates to an user equipment (UE) operation upon radio link failure (RLF) detection in a sidelink (SL) carrier aggregation (CA) in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to operation upon RLF detection in a SL CA in a wireless communication system.

In one embodiment, a UE is provided. The UE includes a transceiver configured to receive, from a base station (BS), configuration information about multiple SL carriers for a SL CA operation. The UE further includes a processor operably coupled to the transceiver, the processor configured to when a hybrid automatic repeat request (HARQ) feedback corresponding to a SL carrier among the multiple SL carriers is not received for consecutive N times and the SL carrier is not a last configured SL carrier, release the SL carrier for a corresponding destination layer 2 identifier (L2 ID); and when the HARQ feedback corresponding to the SL carrier among the multiple SL carriers is not received for a consecutive M times and the SL carrier is the last configured SL carrier, release a PC5-radio resource control (PC5-RRC) connection for the corresponding destination L2 ID.

In another embodiment, a method of a UE is provided. The method comprises: receiving, from a BS, configuration information about multiple SL carriers for a SL CA operation; when a HARQ feedback corresponding to a SL carrier among the multiple SL carriers is not received for consecutive N times and the SL carrier is not a last configured SL carrier, releasing the SL carrier for a corresponding destination L2 ID; and when the HARQ feedback corresponding to the SL carrier among the multiple SL carriers is not received for a consecutive M times and the SL carrier is the last configured SL carrier, releasing a PC5-RRC connection for the corresponding destination L2 ID.

In yet another embodiment, a BS is provided. The BS includes a processor configured to generate configuration information about multiple SL carrier. The BS further includes a transceiver operably coupled to the processor, the transceiver configured to transmit, to a UE, the configuration information for a SL CA operation, wherein: when a HARQ feedback corresponding to a SL carrier among the multiple SL carriers is not received for consecutive N times and the SL carrier is not a last configured SL carrier, the SL carrier for a corresponding destination L2 ID is released; and when the HARQ feedback corresponding to the SL carrier among the multiple SL carriers is not received for a consecutive M times and the SL carrier is the last configured SL carrier, a PC5-RRC connection for the corresponding destination L2 ID is released.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.321 v17.0.0, "NR; Medium Access Control (MAC) protocol specification"; 3GPP TS 38.331 v17.0.0, "NR Radio Resource Control (RRC) protocol specification"; 3GPP TS 38.300 v17.0.0, "NR and NG-RAN Overall Description stage 2"; 3GPP TR 38.885 v16.0.0, "Study on NR Vehicle-to-Everything (V2X)"; 3GPP TS 23.303 v17.0.0, "Proximity-based services (ProSe), stage 2" 1 and 3GPP TS 23.287 v17.2.0, "Architecture enhancements for 5G System (5GS) to support Vehicle-to-Everything (V2X) services."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
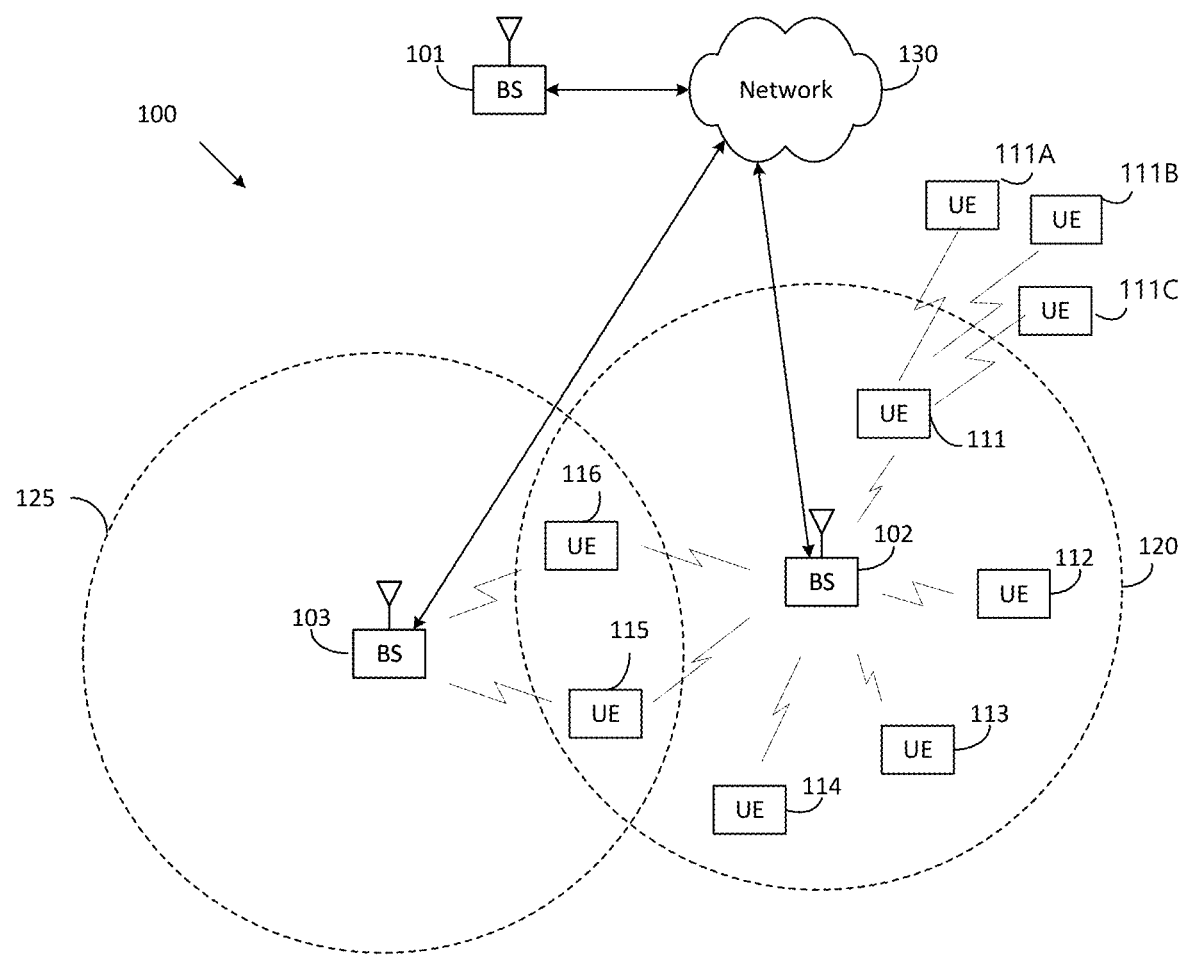
FIG. 1 illustrates an example of wireless network according to embodiments of the present disclosure.
Figure 2:
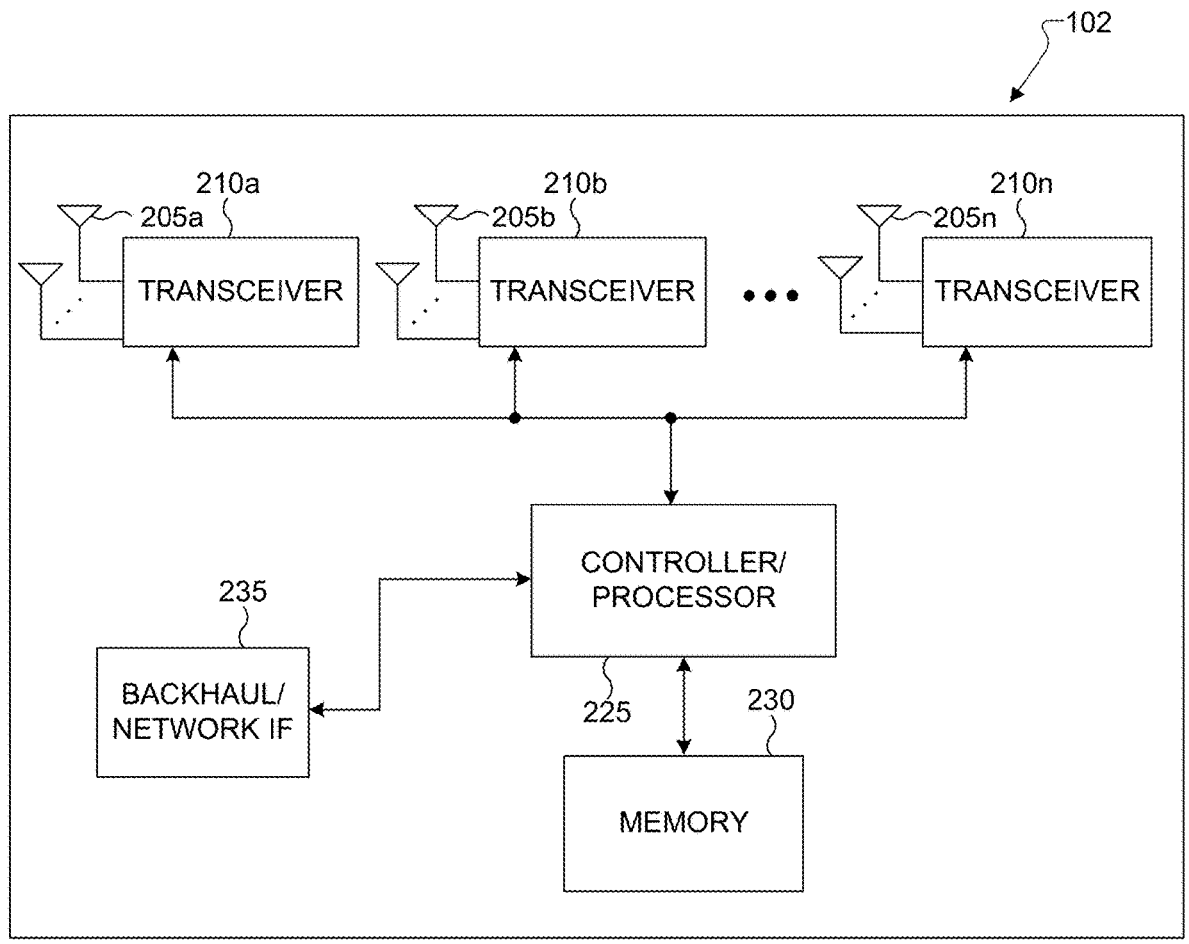
FIG. 2 illustrates an example of gNB according to embodiments of the present disclosure.
Figure 3:
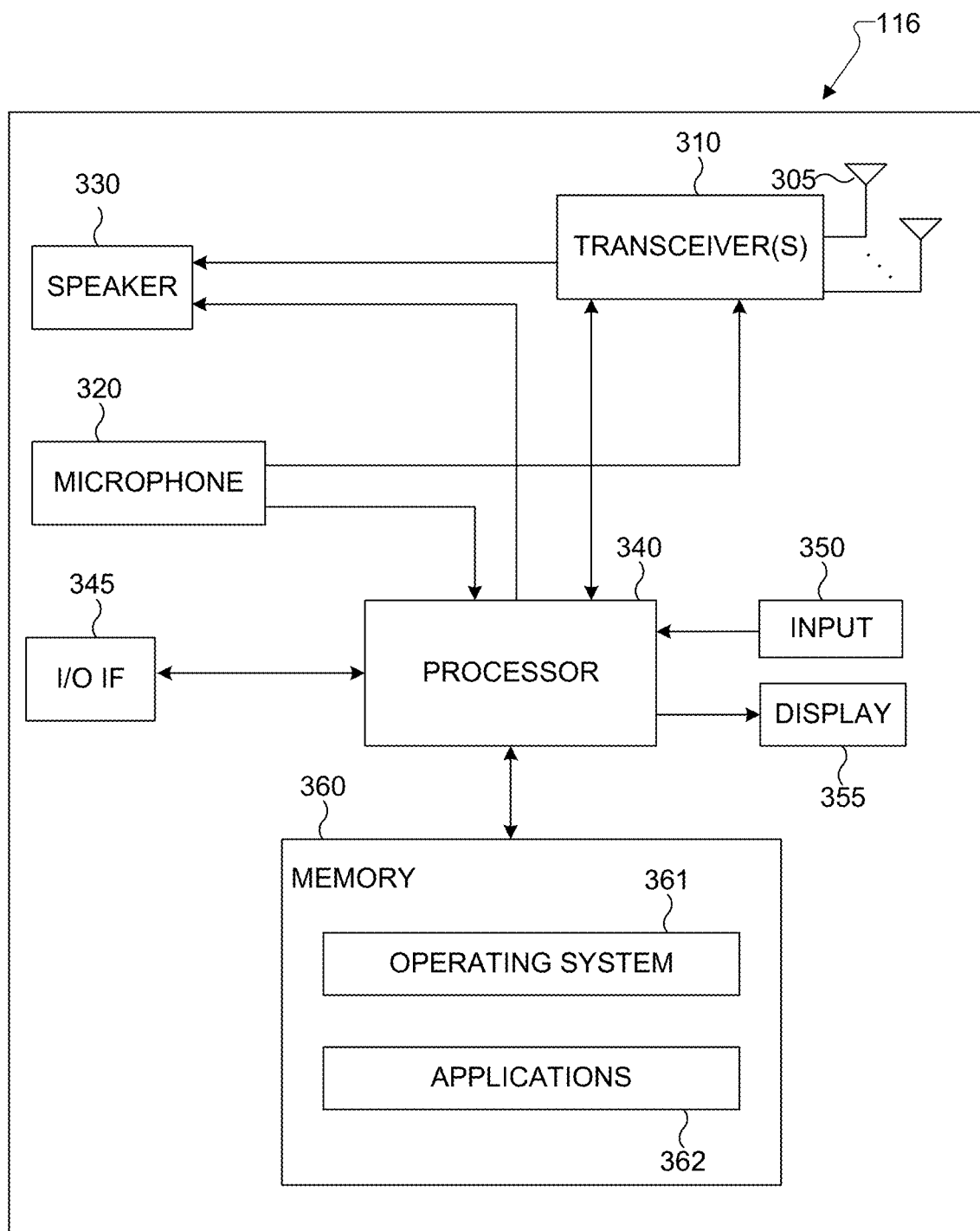
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for an UE operation upon RLF detection in a SL CA in a wireless communication system. In certain embodiments, and one or more of the gNBs 101-103 includes circuitry, programing, or a combination thereof, for supporting an UE operation upon RLF detection in a SL CA in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes, for example, to support an UE operation upon RLF detection in a SL CA in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL and/or SL channels and/or signals and the transmission of UL and/or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for an UE operation upon RLF detection in a SL CA in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
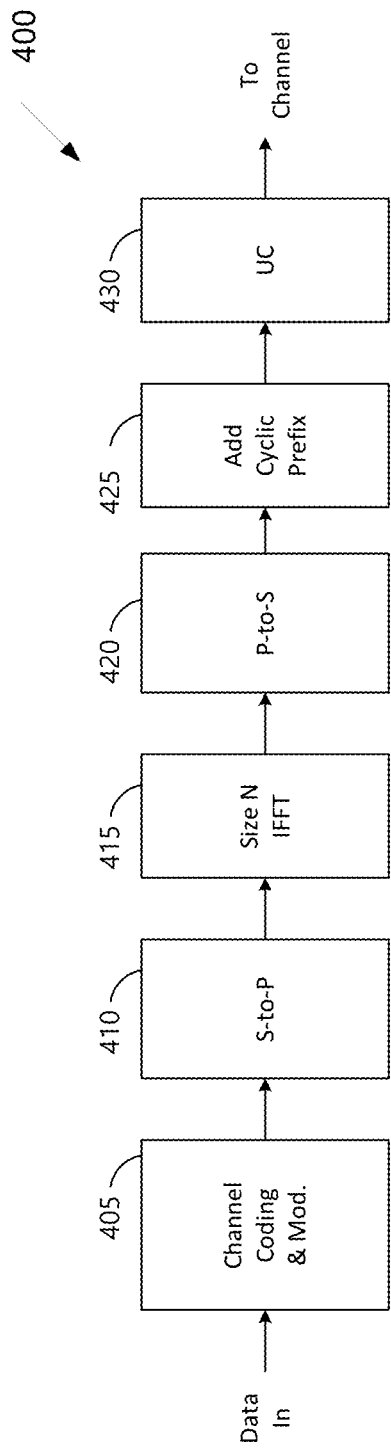
FIGS. 4 and 5 illustrate example of wireless transmit and receive paths according to this disclosure.
Figure 5:
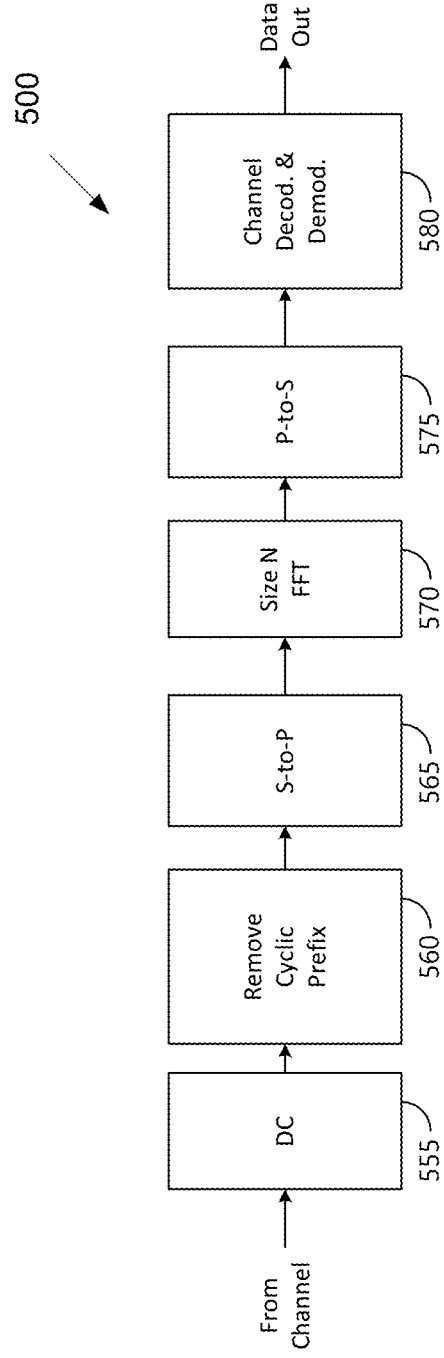

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support operation upon RLF detection in a SL CA in a wireless communication system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In 3GPP wireless standards, new radio access technology (NR) has been specified as 5G wireless communication. One of NR features is vehicle-to-everything (V2X).

Figure 6:
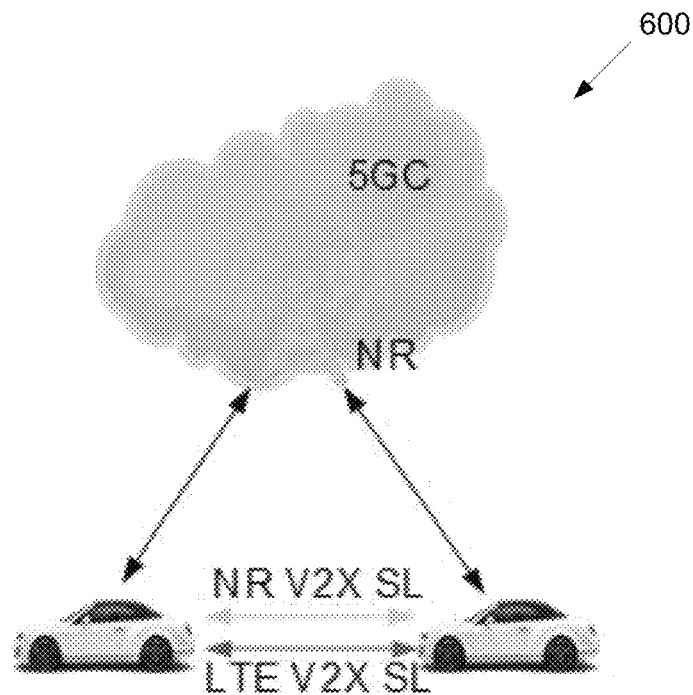
FIG. 6 illustrates an example of V2X communication over SL according to embodiments of the present disclosure.

FIG. 6 illustrates an example of V2X communication over SL 600 according to embodiments of the present disclosure. An embodiment of the V2X communication over SL 600 shown in FIG. 6 is for illustration only.

FIG. 6 describes the example scenario of vehicle to vehicle communication. Two or multiple vehicles can transmit and receive data/control over direct link/interface between vehicles. The direct link/interface between vehicles or between vehicle and other things is named as SL in 3GPP, so "SL communication" is also commonly used instead of "V2X communication."

Note that FIG. 6 describes the scenario where the vehicles still can communicate with gNB in order to acquire SL resource, SL radio bearer configurations, etc., however it is also possible even without interaction with gNB, vehicles still communicate each other over SL. In the case, SL resource, SL radio bearer configuration, etc. are preconfigured (e.g., via V2X server or any other core network entity).

One of main difference compared to an uplink (UL) that is a link from the UE to the gNB is the resource allocation mechanism for transmission. In UL, the resource for transmission is allocated by the gNB, however in SL, the UE itself selects a resource within the SL resource pool, which is configured by the gNB and selected by the UE if multiple SL resource pools are configured, based on UE's channel sensing result and the required amount of resources for data/control transmission.

For SL communication, the radio interface L1/L2/L3 (Layer 1/Layer 2/Layer 3) protocols consist of physical protocol (PHY), which specified in 3GPP standards TS 38.211, 38.212, 38.213, 38.214, and 38.215), medium access control (MAC), which specified in 3GPP standards TS 38.321), radio link control (RLC), which specified in 3GPP standards TS 38.322), packet data convergence protocol (PDCP), which specified in 3GPP standards TS 38.323), radio resource control (RRC), which specified in 3GPP standards TS 38.331, and service data adaptation protocol (SDAP), which specified in 3GPP standards TS 37.324).

Figure 7A:
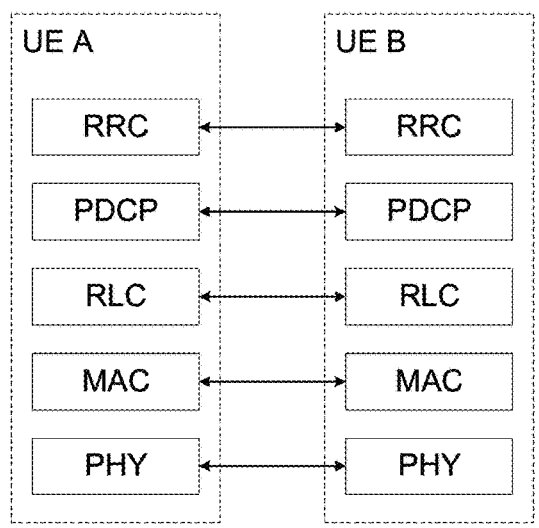
FIGS. 7A and 7B illustrate examples of SL control and user planes radio protocol stacks.
Figure 7B:
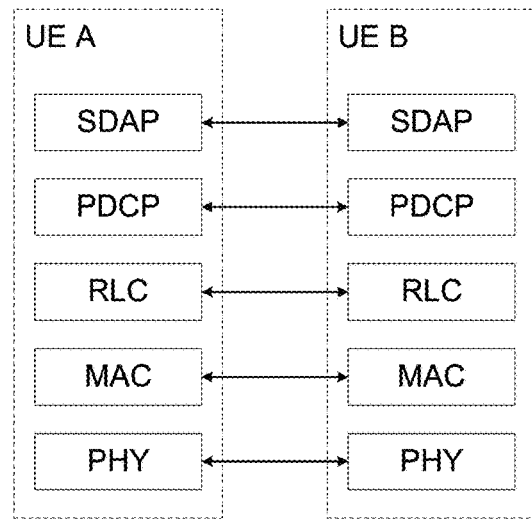

FIGS. 7A and 7B illustrate examples of SL control and user planes radio protocol stack 700 according to embodiments of the present disclosure. An embodiment of the SL control and user planes radio protocol stack 700 shown in FIG. 7 is for illustration only.

FIG. 7A illustrates an example of a SL control plane radio protocol stack (for SL-RRC) and FIG. 7B illustrates an example of SL user plane data radio protocol stack for NR SL communication.

Physical protocol layer handles physical layer signals/channels and physical layer procedures (e.g., physical layer channel structure, physical layer signal encoding/decoding, SL power control procedure, SL cannel status information (CSI) related procedure).

Main physical SL channels and signals are defined as follow: (1) physical sidelink control channel (PSCCH) indicates resource and other transmission parameters used by a UE for PSSCH; (2) physical sidelink shared channel (PSSCH) transmits the TBs of data themselves and CSI feedback information, etc.; (3) physical sidelink feedback channel (PSFCH) transmits HARQ feedback over the sidelink from a UE which is an intended recipient of a PSSCH transmission to the UE which performed the transmission; (4) sidelink synchronization signal includes sidelink primary and sidelink secondary synchronization signals (S-PSS, S-SSS); and (5) physical sidelink broadcast channel (PSBCH) indicates the required essential system information for SL operations.

MAC protocol layer performs packet filtering (e.g., determine whether the received packet is actually destined to the UE (based on the L2 source and destination ids in the MAC header), SL carrier/resource pool/resource within the resource pool (re)selection, priority handling between SL and UL for a given UE, SL logical channel prioritization, the corresponding packet multiplexing (e.g., multiplexing multiple MAC SDUs into a given MAC PDU) and SL HARQ retransmissions/receptions. RLC protocol layer performs RLC SDU segmentation/SDU reassembly, re-segmentation of RLC SDU segments, error correction through ARQ (only for AM data transfer).

PDCP protocol layer performs header compression/decompression, ciphering and/or integrity protection, duplication detection, re-ordering and in-order packet delivery to the upper layer and out-of-order packet delivery to the upper layer. RRC protocol layer performs transfer of a SL-RRC message, which is also named as PC5-RRC (PC5 indicates the reference point between UEs for SL communication), between peer UEs, maintenance and release of SL-RRC connection between two UEs, and detection of SL radio link failure for a SL-RRC connection. SDAP protocol layer performs mapping between a QoS (Quality of Service) flow and a SL data radio bearer. Note that the term of SL-RRC or PC5-RRC is used in the present disclosure.

In 3GPP Rel-18, it is planned to introduce more features into SL communication and one of the candidate features is to enable carrier aggregation (CA) in SL communication. CA is a mechanism to transmit and/or receive control/data over multiple carriers. In Rel-17 SL communication, for SL Unicast (UC), PC5-RRC connection is established between two UEs. A PC5-RRC connection is a logical connection between two UEs for a pair of source and destination layer-2 IDs which is considered to be established after a corresponding PC5 unicast link is established as specified in 3GPP standard specification.

For each PC5-RRC connection of unicast, one sidelink SRB (i.e., SL-SRB0) is used to transmit the PC5-S message(s) before the PC5-S security has been established. One sidelink SRB (i.e., SL-SRB1) is used to transmit the PC5-S messages to establish the PC5-S security. One sidelink SRB (i.e., SL-SRB2) is used to transmit the PC5-S messages after the PC5-S security has been established, which is protected. One sidelink SRB (i.e., SL-SRB3) is used to transmit the PC5-RRC signalling, which is protected and only sent after the PC5-S security has been established. There is one-to-one correspondence between the PC5-RRC connection and the PC5 unicast link. A UE may have multiple PC5-RRC connections with one or more UEs for different pairs of source and destination layer-2 IDs. Separate PC5-RRC procedures and messages are used for a UE to transfer UE capability and sidelink configuration to the peer UE as specified in 3GPP standard specification.

Both peer UEs can exchange their own UE capability and sidelink configuration using separate bi-directional procedures in both sidelink directions. If SL RLF on the PC5-RRC connection is declared, UE releases the PC5-RRC connection. SL RLF can be detected in MAC based on HARQ feedback as specified in 3GPP standard specification.

The HARQ-based sidelink RLF detection procedure is used to detect Sidelink RLF based on a number of consecutive DTX on PSFCH reception occasions for a PC5-RRC connection.

RRC configures the following parameter to control HARQ-based Sidelink RLF detection: (1) sl-maxNumConsecutiveDTX.

The following UE variable is used for HARQ-based Sidelink RLF detection: (1) numConsecutiveDTX, which is maintained for each PC5-RRC connection.

The sidelink HARQ Entity shall (re-)initialize numConsecutiveDTX to zero for each PC5-RRC connection which has been established by upper layers, if any, upon establishment of the PC5-RRC connection or (re)configuration of sl-maxNumConsecutiveDTX.

TABLE 1 shows the HARQ-based Sidelink RLF detection as specified in 3GPP standard specification.

TABLE 1

HARQ-based Sidelink RLF detection

The Sidelink HARQ Entity shall for each PSFCH reception occasion associated to the PSSCH transmission:
1>      if PSFCH reception is absent on the PSFCH reception occasion:
   2>      increment numConsecutiveDTX by 1;
   2>      if numConsecutiveDTX reaches sl-maxNumConsecutiveDTX:
      3>   indicate HARQ-based Sidelink RLF detection to RRC.
1>      else:
   2>      re-initialize numConsecutiveDTX to zero.

Also, SL RLF can be detected in RRC if the following conditions, as shown in TABLE 2, are met, which specified in 3GPP standard specification.

TABLE 2

| Condition for the SL RLF |
|---|
| 1> upon indication from sidelink RLC entity that the maximum number of retransmissions for a specific destination has been reached; or |
| 1> upon T400 expiry for a specific destination; or |
| 1> upon integrity check failure indication from sidelink PDCP entity concerning SL-SRB2 or SL-SRB3 for a specific destination |

Once RRC detects SL RLF or RRC receives HARQ-based sidelink RLF detection from MAC, RRC performs the following operations as specified in 3GPP standard specification, as shown in TABLE 3.

TABLE 3

| RRC operation |
|---|
| 2> consider sidelink radio link failure to be detected for this destination; |
| 2> release the DRBs of this destination, in according to sub-clause 5.8.9.1a.1; |
| 2> release the SRBs of this destination, in according to sub-clause 5.8.9.1a.3; |
| 2> discard the NR sidelink communication related configuration of this destination; |
| 2> reset the sidelink specific MAC of this destination; |
| 2> consider the PC5-RRC connection is released for the destination; |
| 2> indicate the release of the PC5-RRC connection to the upper layers for this destination (i.e., PC5 is unavailable); |
| 2> if UE is in RRC_CONNECTED: |
| 3> perform the sidelink UE information for NR sidelink communication procedure, as specified in 5.8.3.3; |
| "perform the sidelink UE information for NR sidelink communication procedure, as specified in 5.8.3.3" is to inform the serving gNB of sidelink RLF corresponding to each SL UC link (or each destination UE id) as follow. |
| 4> if a sidelink radio link failure or a sidelink RRC reconfiguration failure has been declared, according to clauses 5.8.9.3 and 5.8.9.1.8, respectively; |
| 5> include sl-FailureList and set its fields as follows for each destination for which it reports the NR sidelink communication failure: |
| 6> set sl-DestinationIdentity to the destination identity configured by upper layer for NR sidelink communication transmission; |
| 6> if the sidelink RLF is detected as specified in sub-clause 5.8.9.3: |
| 7> set sl-Failure as rlf for the associated destination for the NR sidelink communication transmission; |
| 6> else if RRCReconfigurationFailureSidelink is received: |
| 7> set sl-Failure as configFailure for the associated destination for the NR sidelink communication transmission. |

Note SL specific MAC reset is defined as shown in TABLE 4.

TABLE 4

| SL specific MAC reset |
|---|
| If a Sidelink specific reset of the MAC entity is requested for a PC5-RRC connection by upper layers, the MAC entity shall: |
| 1> flush the soft buffers for all Sidelink processes for all TB(s) associated to the PC5-RRC connection; |
| 1> consider all Sidelink processes for all TB(s) associated to the PC5-RRC connection as unoccupied; |
| 1> cancel, if any, triggered Scheduling Request procedure only associated to the PC5-RRC connection; |
| 1> cancel, if any, triggered Sidelink Buffer Status Reporting procedure only associated to the PC5-RRC connection; |
| 1> cancel, if any, triggered Sidelink CSI Reporting procedure associated to the PC5-RRC connection; |
| 1> stop (if running) all timers associated to the PC5-RRC connection; |
| 1> reset the numConsecutiveDTX associated to the PC5-RRC connection; |
| 1> initialize SBj for each logical channel associated to the PC5-RRC connection to zero. |

Figure 8A:
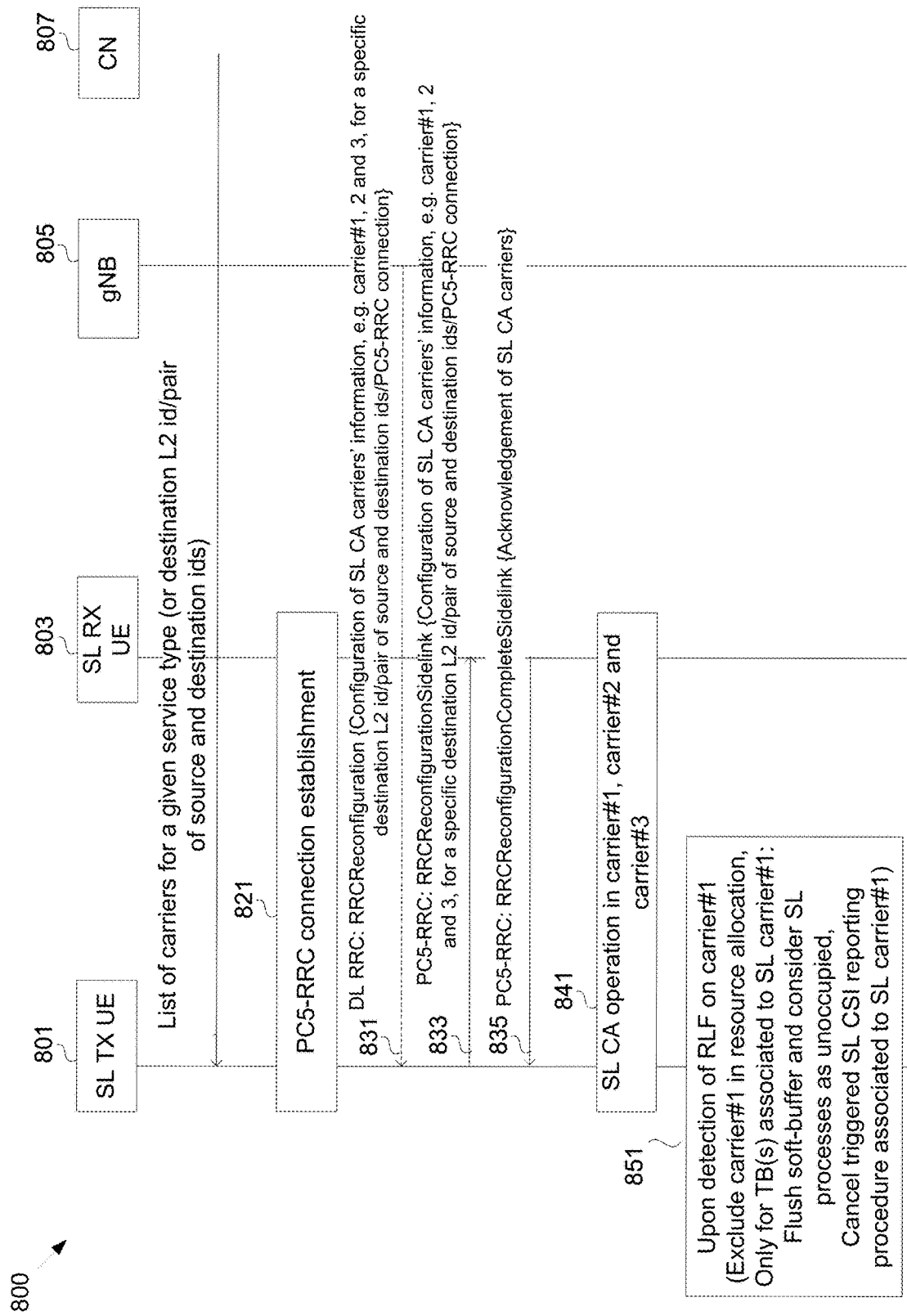
FIGS. 8A and 8B illustrate signaling flows for an RLF operation in SL CA according to embodiments of the present disclosure.
Figure 8B:
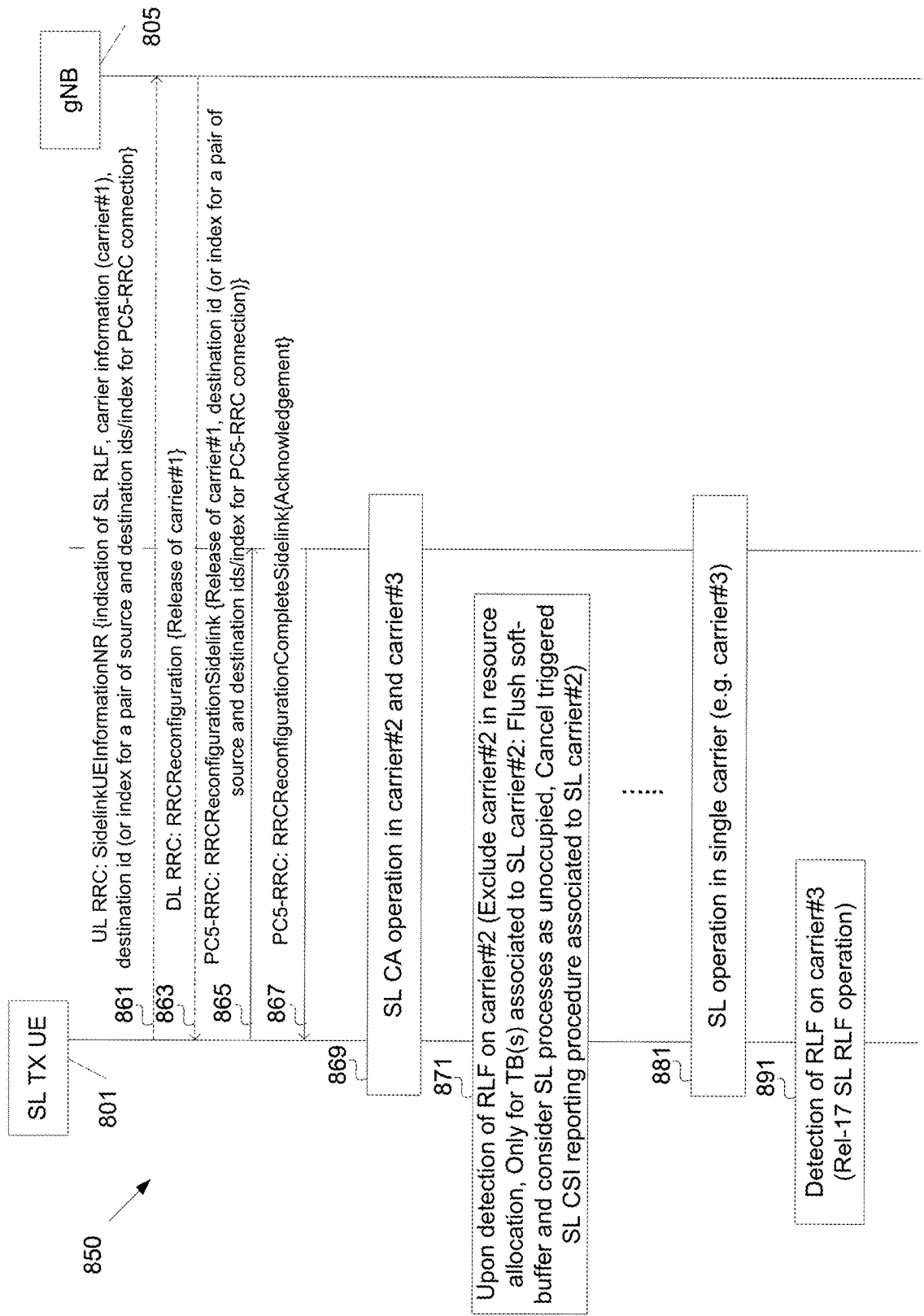

FIGS. 8A and 8B illustrate signaling flows 800 and 850 for an RLF operation in SL CA according to embodiments of the present disclosure. The signaling flows 800 and 850 1400 as may be performed by a UE (e.g., 111-116 as illustrated in FIG. 1) and a BS (e.g., 101-103 as illustrated in FIG. 1). An embodiment of the signaling flows 800 and 850 shown in FIGS. 8A and 8B is for illustration only. One or more of the components illustrated in FIGS. 8A and 8B can be implemented in specialized circuitry configured to perform the noted functions or one or more of the components can be implemented by one or more processors executing instructions to perform the noted functions. FIG. 8B is connected to FIG. 8A.

In one embodiment, RLF operation in SL CA is provided. FIGS. 8A and 8B describes one example of embodiments for RLF operation in SL CA. An SL UE (801) is configured for transmission. An SL UE (803) is configured for reception, a serving gNB (805) of the UE (801), and a core network (CN, 807) entity is charged of SL pre-configuration. The CN 807 configures a list of carriers for a given service type (or an L2 destination id/a pair of source and destination) to the SL UE (801) via a SL pre-configuration (811). If the SL UE (801) is interested in SL unicast (UC) communication with the SL UE (803), a PC5-RRC connection establishment procedure is performed between the SL UE (801) and the SL UE (803) in 821.

Once the PC5-RRC connection is established, the SL UE (801) can send an RRCReconfigurationSidelink PC5-RRC message to the SL UE (803) to configure SL CA carriers for a specific destination (or a specific pair of source and destination, or a specific PC5-RRC connection) (833). It includes the SL carrier's information (e.g., frequency information for SL carrier #1, #2 and #3) and the corresponding L2 destination id/index for a pair of source and destination ids/index for a PC5-RRC connection. The SL UE (803) sends an RRCReconfigurationCompleteSidelink PC5-RRC message to the SL UE (801) when the SL CA carriers in 833 are configured successfully (835).

Note if the SL UE (801) is in an RRC connected state and/or the SL UE (801) is in a mode 1 operation/resource allocation for SL transmission, the gNB (805) can configure SL CA carriers for a specific destination (or a specific pair of source and destination, or a specific PC5-RRC connection) prior to 833 and 835 procedures in 831. In this case, SL CA carriers' configuration in 833 may be same as the one in 831.

Once 833 and 835 procedures are successfully done, the SL UE (801) can transmit data and/or control information over the configured multiple SL carriers from 833 (in 841). The SL UE (803) also can monitor only data and/or control information receptions over the configured multiple SL carriers from 833. Note the list of SL carriers for a specific destination (or a specific pair of source and destination, or a specific PC5-RRC connection) in 811 and 833 may not be exactly same. For instance, the list of SL carriers in 833 can be a subset of the list of SL carriers in 811. In the case, for transmission and reception in the SL CA, the SL UE (801) and the SL UE (803) can consider only SL carriers that configured in 833.

It may be assumed that SL carrier #1, #2 and #3 are configured in 833. If the SL UE (801) detects RLF on SL carrier #1, the SL UE excludes SL carrier #1 in (further) resource allocation, considers the already allocated resources in SL carrier #1 as invalid ones, flush the soft buffers for all SL processes for all TB(s) associated to the destination (or the pair of source and destination, or the PC5-RRC connection) and SL carrier #1 (resource(s) for TB(s) transmission(s) are in SL carrier #1), consider all SL processes for all TB(s) associated to the destination (or the pair of source and destination, or the PC5-RRC connection) and SL carrier #1 (resource(s) for TB(s) transmission(s) are in SL carrier #1) as unoccupied, and cancel if any, triggered SL CSI reporting procedure associated to the destination (or the pair of source and destination, or the PC5-RRC connection) and SL carrier #1 (851).

Then the SL UE (801) sends RRCReconfigurationSidelink PC5-RRC message to the SL UE (803) to release SL carrier #1 from SL CA carriers (865). RRCReconfigurationSidelink PC5-RRC message includes SL carrier information to be released (e.g., frequency information for SL carrier) possibly with SL RLF cause indication/value and the associated destination id (or index for a pair of source and destination ids, or index of PC5-RRC connection). The SL UE (803) responds RRCReconfigurationCompleteSidelink PC5-RRC message to the SL UE (801) in 867.

The SL UE (801) and the SL UE (803) release SL carrier #1 from SL CA and transmit/receive data and/or control information only in remaining SL carriers, e.g., SL carrier #2 and #3 (869). Note if the SL UE (801) is in the RRC connected state and/or the SL UE (803) is in the mode 1 operation/resource allocation for SL transmission, the UE informs the gNB (805) of detection of a specific destination's (or a specific pair of source and destination, or a specific PC5-RRC connection) SL RLF status in SL carrier #1 via a SidelinkUEInformationNR UL-RRC message (861) and the gNB can release SL carrier #1 from SL CA carriers via RRCReconfiguration DL-RRC message (863) prior to 865 and 867 procedures. 861 includes indication of SL RLF, SL carrier information where SL RLF happened (e.g., frequency information for SL carrier #1), and the associated destination id (or index for a pair of source and destination ids, or index for PC5-RRC connection).

After SL carrier #1 is released, if the SL UE (801) detects RLF on SL carrier #2 (871), the SL UE excludes SL carrier #2 in (further) resource allocation, considers the already allocated resources in SL carrier #2 as invalid ones, flush the soft buffers for all SL processes for all TB(s) associated to the destination (or the pair of source and destination, or the PC5-RRC connection) and SL carrier #2 (resource(s) for TB(s) transmission(s) are in SL carrier #2), consider all SL processes for all TB(s) associated to the destination (or the pair of source and destination, or the PC5-RRC connection) and SL carrier #2 (resource(s) for TB(s) transmission(s) are in SL carrier #2) as unoccupied, and cancel if any, triggered SL CSI reporting procedure associated to the destination (or the pair of source and destination, or the PC5-RRC connection) and SL carrier #2 (871).

Note although the figure omits the following procedures, the SL UE (801) and the SL UE (803) may perform the similar procedures described in 861, 863, 865, and 867 to release SL carrier #2 from SL CA carriers. With release of SL carrier #2, the SL UE (801) and the SL UE (803) transmit and receive data and/or control information only in single SL carrier (e.g., SL carrier #3) (881). If the SL UE (801) detects RLF in SL carrier #3, the UE applies legacy SL RLF operation specified in 3GPP standard specification, which already explained above (891).

Note in the figure, it is assumed the SL TX UE (801) detects SL RLF. As another example, if the SL RX UE (803) detects SL RLF, the SL RX UE (803) can inform the SL TX UE (801) of SL RLF detection with the associated destination information (L2 destination id, index for a pair of L2 source and destination ids, or index for PC5-RRC connection) and SL carrier information (frequency information for the SL carrier where SL RLF is detected). That information can be sent via UEAssistanceInformationSidelink PC5-RRC message.

Note in the figure, it is assumed that no special SL carrier in SL CA is defined. The UE applies different SL RLF operation dependent on whether the SL carrier where SL RLF is detected is the last configured one or not for SL transmission. If it is not the last one, the UE applies the operation described in 851 and 871. If it is the last one, the UE applies the legacy operation described in 891. As another example, special SL carrier can be introduced. Then if the SL carrier where SL RLF is detected is not the special SL carrier, the UE applies same or similar operation described in 851 and 871. If the SL carrier where SL RLF is detected is the special SL carrier, the UE applies the legacy operation described in 891. In order to support special SL carrier, when SL CA carriers are configured in 831 or 833, information to indicate which SL carrier is special SL carrier needs to be added in 831 or 833.

Note in the figure, it is assumed that PC5-RRC message is used to configure SL CA carriers between the UEs (801 and 803). As another example, SL CA carrier information can be configured by system information block. For example, candidate SL CA carrier information associated to QoS (Quality of Service) can be broadcast by system information block. The UEs (801 and 803) select SL CA carriers according to QoS they intend to transmit and/or receive. For example, SL carrier #1 and #3 are configured for QoS #A and SL carrier #2 and #4 are configured for QoS #B. If QoS mapped to SL logical channel (or SL service type) the UE intends to transmit and/or receive data is QoS #A, the UE applies SL carrier #1 and #3 for SL CA operation.

Figure 9:
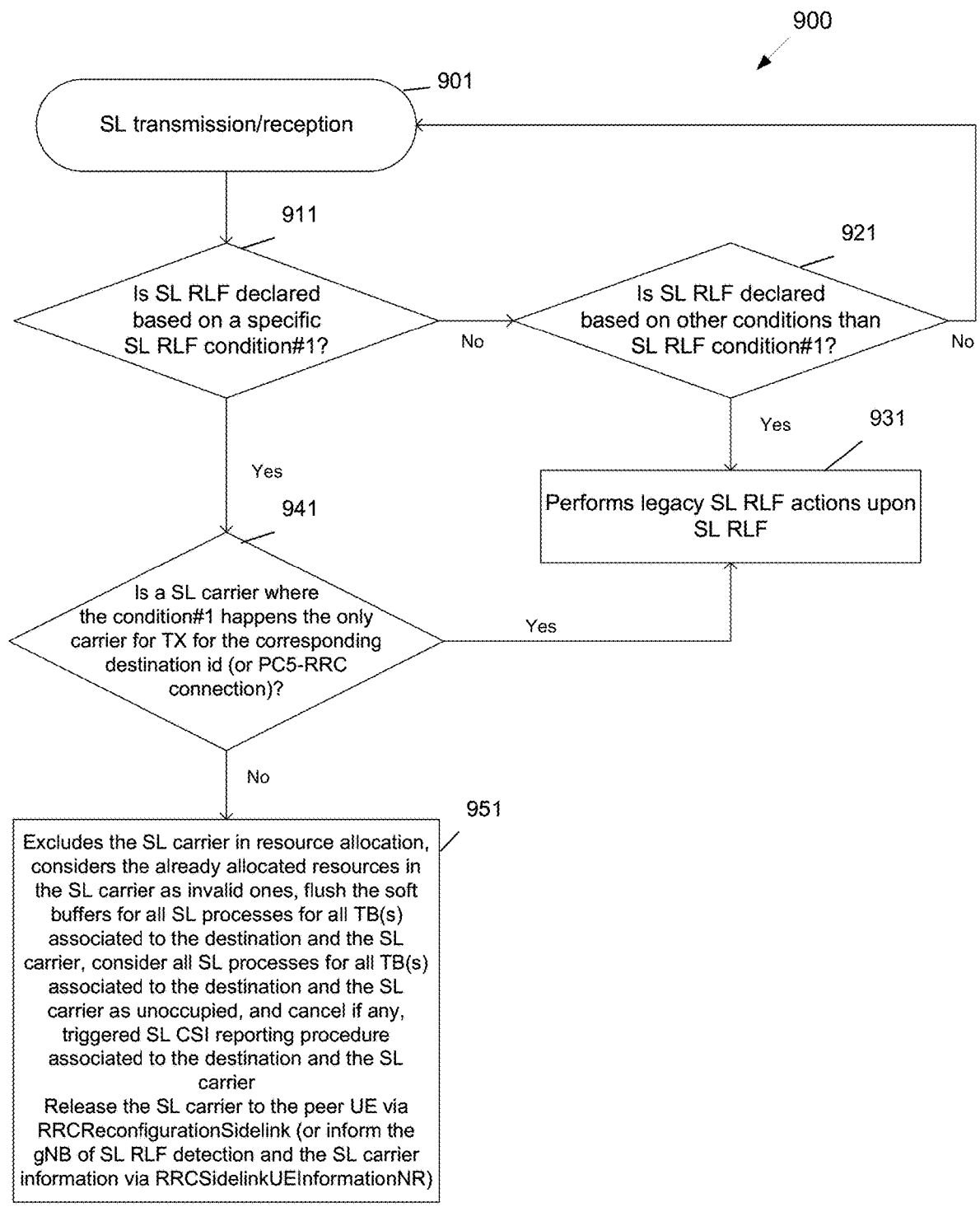
FIG. 9 illustrates a flowchart of method for UE according to embodiments of the present disclosure.

FIG. 9 illustrates a flowchart of method 900 for UE according to embodiments of the present disclosure. The method 900 as may be performed by a UE (e.g., 111-116 as illustrated in FIG. 1). An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 describes one example of a SL UE behavior's flow chart according to the embodiment in FIG. 8. The UE is assumed in SL transmission and/or reception (901). If SL RLF is declared in a SL carrier based on a specific SL RLF condition (hereafter it is called as SL RLF condition #1) in 911, the UE checks if the SL carrier where SL RLF condition #1 occurred is the only SL carrier for transmission and/or reception for the corresponding destination id (or an index for a pair of source and destination ids, or an index of PC5-RRC connection) in 941.

As example of SL RLF condition #1, SL RLF is detected in a specific SL carrier, upon indication from MAC entity that the maximum number of consecutive HARQ DTX for a specific destination has been reached. If the SL carrier is the only SL carrier for transmission and/or reception for the corresponding destination id (or an index for a pair of source and destination ids, or an index of PC5-RRC connection), the UE performs legacy SL RLF actions specified in 3GPP standard specification in 931.

If the SL carrier is not the only SL carrier for transmission and/or reception for the corresponding destination id (or an index for a pair of source and destination ids, or an index of PC5-RRC connection) in 941, which means the UE is configured with multiple SL carriers for SL CA, the UE excludes the SL carrier in (further) resource allocation, considers the already allocated resources in the SL carrier as invalid ones, flush the soft buffers for all SL processes for all TB(s) associated to the destination (or the pair of source and destination, or the PC5-RRC connection) and the SL carrier (resource(s) for TB(s) transmission(s) are in the SL carrier), consider all SL processes for all TB(s) associated to the destination (or the pair of source and destination, or the PC5-RRC connection) and the SL carrier (resource(s) for TB(s) transmission(s) are in the SL carrier) as unoccupied, and cancel if any, triggered SL CSI reporting procedure associated to the destination (or the pair of source and destination, or the PC5-RRC connection) and the SL carrier in 951.

The UE also releases the SL carrier possibly with SL RLF cause/indication to the peer UE via RRCReconfigurationSidelink in 951. Note if the UE is in RRC connected state and/or the UE is in mode 1 operation/resource allocation for SL transmission, the UE informs the serving gNB of SL RLF detection with the SL carrier information and the corresponding destination id (or an index for pair of source and destination ids, or an index of PC5-RRC connection) in 951. If SL RLF is declared based on other conditions than SL RLF condition #1 in 921, the UE performs legacy SL RLF actions specified in 3GPP standard specification in 931.

As example of the other conditions than SL RLF condition #1, SL RLF is detected upon indication from SL RLC entity that the maximum number of retransmissions for a specific destination has been reached, or upon T400 expiry for a specific destination, or upon integrity check failure indication from SL PDCP entity concerning SL-SRB2 or SL-SRB3 for a specific destination.

Figure 10A:
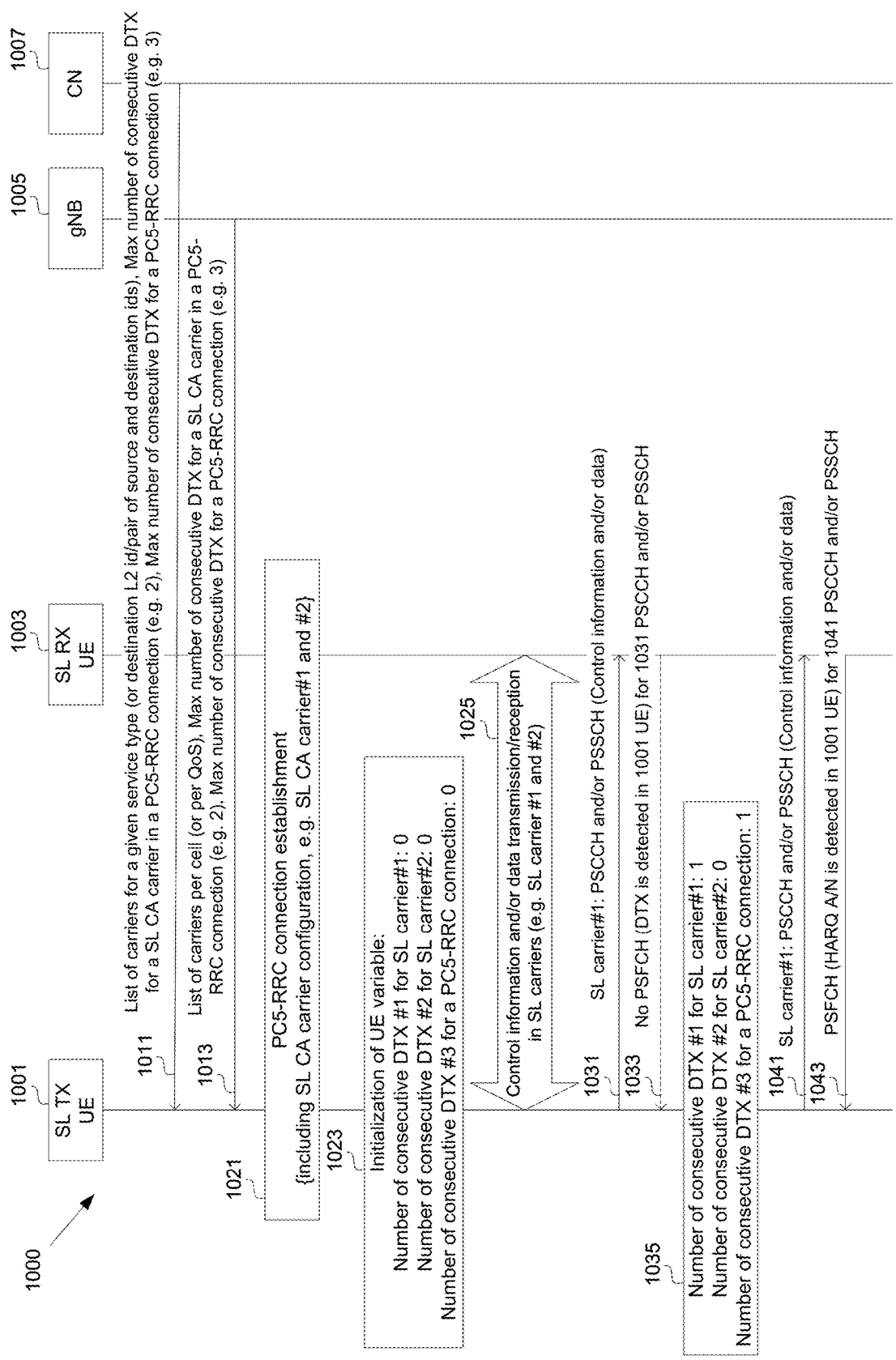
FIGS. 10A and 10B illustrate signaling flows for an HARQ-based SL RLF detection in SL CA according to embodiments of the present disclosure.
Figure 10B:
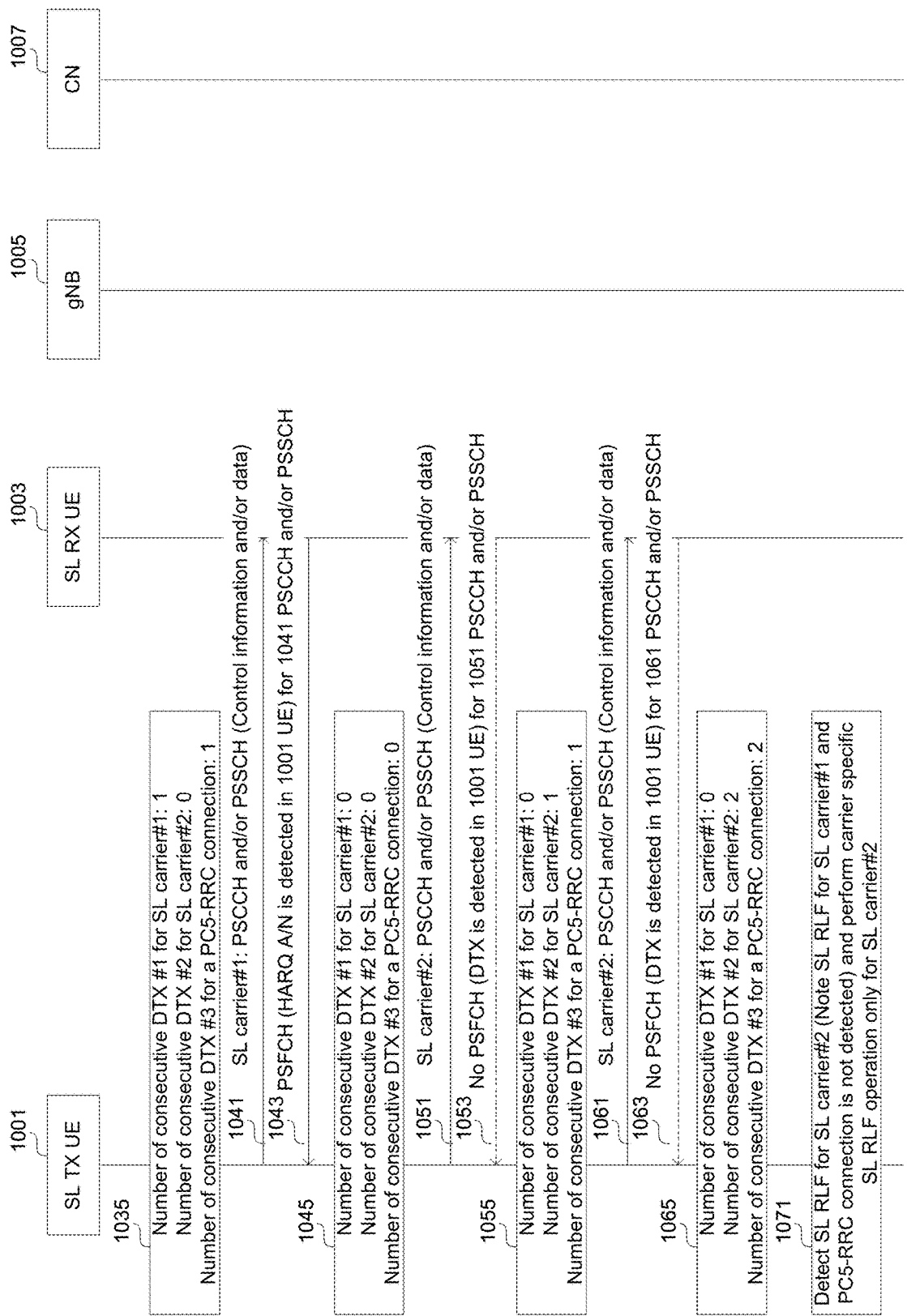

FIGS. 10A and 10B illustrate signaling flows 1000 and 1050 for HARQ-based SL RLF detection in SL CA according to embodiments of the present disclosure. The signaling flows 1000 and 1050 as may be performed by a UE (e.g., 111-116 as illustrated in FIG. 1) and a base station (e.g., 101-103 as illustrated in FIG. 1). An embodiment of the signaling flows 1000 and 1050 shown in FIGS. 10A and 10B is for illustration only. One or more of the components illustrated in FIGS. 10A and 10B can be implemented in specialized circuitry configured to perform the noted functions or one or more of the components can be implemented by one or more processors executing instructions to perform the noted functions. FIG. 10A and FIG. 10B are connected together.

In one embodiment, HARQ-based SL RLF detection in SL CA is provided. FIGURES and 10B describe one example of embodiments for the HARQ-based SL RLF detection in SL CA. An SL UE (1001) is configured for an SL transmission, a peer SL UE (1003) is configured for an SL reception, a serving gNB (1005) of the UE (1001), and a core network (CN, 1007) entity is charged for an SL pre-configuration. The CN (1007) pre-configures a list of SL carriers for a given service type (or a L2 destination id/a pair of source and destination ids), a max number of consecutive DTX for a SL CA carrier in a PC5-RRC connection (hereafter it is called as max number #1), and a max number of consecutive DTX for a PC5-RRC connection (hereafter it is called as max number #2) to the SL UE (1001) in 1011.

The gNB (1005) configures available list of SL CA carriers in the serving cell (or list of SL CA carriers per QoS(s) in the serving cell), max number of consecutive DTX for a SL CA carrier in a PC5-RRC connection (hereafter it is called as max number #1), and a max number of consecutive DTX for a PC5-RRC connection (hereafter it is called as max number #2) to the SL UE (1001) in 1013. For max number #1 and max number #2 if the SL UE (1001) is located out of the gNB coverage, the UE applies pre-configuration from 1011, otherwise if the UE is located in the serving cell of the gNB, the UE applies configuration from 1013. For candidate SL CA carriers, if the SL UE (1001) is located out of the gNB coverage, the UE applies pre-configuration from 1011 according to the UE's interested service type (or a L2 destination id/a pair of source and destination ids) and possibly UE location otherwise if the UE is located in the serving cell of the gNB, the UE applies SL CA carriers that can be supported from both 1011 and 1013 according to the UE's interested service type (or a L2 destination id/a pair of source and destination ids). 1013 can be signaled by either a system information block or a UE dedicated RRC message.

One example of the UE dedicated RRC message is RRCReconfiguration message defined in 3GPP standard specification. It may be assumed that max number #1 is pre-configured or configured to 2 and max number #2 is pre-configured or configured to 3 in 1011/1013. If the SL UE (1001) is interested in SL unicast (UC) communication with the SL UE (1003), a PC5-RRC connection establishment procedure is performed between the SL UE (1001) and the SL UE (1003) in 1021. During PC5-RRC connection establishment, SL CA carriers that are actually used for SL transmissions and/or receptions between the two UEs can be also configured. It may be assumed that SL carrier #1 and #2 are configured as SL CA carriers. Note that SL CA carriers can be also configured by a separate SL RRC reconfiguration procedure after PC5-RRC connection is established.

The SL UE (1001) initializes UE variables once SL CA is configured/activated (1023). The UE maintains three variables of number of consecutive DTX. First one is a number of consecutive DTX that is applied to SL carrier #1 (for an associated PC5-RRC connection), second one is a number of consecutive DTX that is applied to SL carrier #2 (for an associated PC5-RRC connection) and the third one is a number of consecutive DTX that is applied to a PC5-RRC connection. Note that it may be assumed that there is one PC5-RRC connection between the UEs (1001 and 1003). If there are multiple PC5-RRC connections between the UEs (1001 and 1003), the UE may need to maintain {3*a number of PC5-RRC connections} a number of consecutive DTX. The UE sets all three number of consecutive DTX as 0. The SL UEs (1001 and 1003) can send and/or receive SL control information and/or data over SL carrier #1 and SL carrier #2 (1025).

For example, the SL UE (1001) sends SL control information and/or data in PSCCH and/or PSSCH over SL carrier #1 (1031) and if the UE does not receive/detect HARQ Ack/Nack (A/N) (which is also expressed as DTX is detected) from the PSFCH resource associated to 1031 PSCCH and/or PSSCH (1033), the UE increments a number of consecutive DTX #1 for the scheduled SL carrier (in this case, it is SL carrier #1) and a number of consecutive DTX #3 for the scheduled PC5-RRC connection by 1 while UE does not change a number of consecutive DTX #2 for the other SL carrier (in this case, it is SL carrier #2) (1035).

As a result, a number of consecutive DTX #1 for SL carrier #1 and a number of consecutive DTX #3 for the PC5-connection are incremented to 1 and a number of consecutive DTX #2 for SL carrier #2 remains as 0. Then the UE sends SL control information and/or data in PSCCH and/or PSSCH over SL carrier #1 (1041) and if the UE receives/detect HARQ A/N from the PSFCH resource associated to 1041 PSCCH and/or PSSCH (1043), the UE re-initializes a number of consecutive DTX #1 for the scheduled SL carrier (in this case, it is SL carrier #1) and a number of consecutive DTX #3 for the scheduled PC5-RRC connection to 0 (1045).

As a result, a number consecutive DTX #1 for SL carrier #1, a number of consecutive DTX #2 for SL carrier #2 and a number of consecutive DTX #3 for the PC5-RRC connection are 0. Then the UE sends SL control information and/or data in PSCCH and/or PSSCH over SL carrier #2 (1051) and if the UE does not receive/detect HARQ Ack/Nack (A/N) (which is also expressed as DTX is detected) from the PSFCH resource associated to 1051 PSCCH and/or PSSCH (1053), the UE increments a number of consecutive DTX #2 for the scheduled SL carrier (in this case, it is SL carrier #2) and a number of consecutive DTX #3 for the scheduled PC5-RRC connection by 1 while UE does not change a number of consecutive DTX #1 for the other SL carrier (in this case, it is SL carrier #1) (1055).

As a result, a number of consecutive DTX #2 for SL carrier #2 and a number of consecutive DTX #3 for the PC5-connection are incremented to 1 and a number of consecutive DTX #1 for SL carrier #1 remains as 0. Then the UE sends SL control information and/or data in PSCCH and/or PSSCH over SL carrier #2 (1061) and if the UE does not receive/detect HARQ Ack/Nack (A/N) (which is also expressed as DTX is detected) from the PSFCH resource associated to 1061 PSCCH and/or PSSCH (1063), the UE increments a number of consecutive DTX #2 for the scheduled SL carrier (in this case, it is SL carrier #2) and a number of consecutive DTX #3 for the scheduled PC5-RRC connection by 1 while UE does not change a number of consecutive DTX #1 for the other SL carrier (in this case, it is SL carrier #1) (1065).

As a result, a number of consecutive DTX #2 for SL carrier #2 and a number of consecutive DTX #3 for the PC5-connection are incremented to 2 and a number of consecutive DTX #1 for SL carrier #1 remains as 0. Note that it may be assumed that max number #1 is pre-configured or configured to 2 and max number #2 is pre-configured or configured to 3 in 1011/1013. Since a number of consecutive DTX #2 (2) reaches to the pre-configured/configured max number #1 (2), the UE considers SL RLF is detected for SL carrier #2 associated to the PC5-RRC connection (1071).

Note that since a number of consecutive DTX #1 (0) does not reach to the pre-configured/configured max number #1 (2), the UE does not consider SL RLF for SL carrier #1 associated to the PC5-RRC connection, i.e., the UE still uses SL carrier #1 to transmit SL control information and/or data in PSCCH and/or PSSCH. Also note that since a number of consecutive DTX #3 (2) does not reach to the pre-configured/configured max number #2 (3), the UE does not consider SL RLF for the PC5-RRC connection, i.e., keep the PC5-RRC connection.

Once SL RLF is detected for SL carrier #2 associated to the PC5-RRC connection, the UE's MAC performs only for SL carrier #2, 1) release all reserved/configured resources associated to the PC5-RRC connection, 2) stops resource allocation associated to the PC5 connection, 3) flushes the soft buffers for all SL processes for all TB(s) associated to the PC5-RRC connection, 4) considers all Sidelink processes for all TB(s) associated to the PC5-RRC connection as unoccupied, 5) cancels triggered Sidelink CSI Reporting procedure associated to the PC5-RRC connection (if any and it is for SL carrier #2), 6) stops all SL CA carrier specific timers associated to the PC5-RRC connection (if running), and 7) resets all SL CA carrier specific variables associated to the PC5-RRC connection (if any) (e.g., a number of consecutive DTX #2).

Figure 11A:
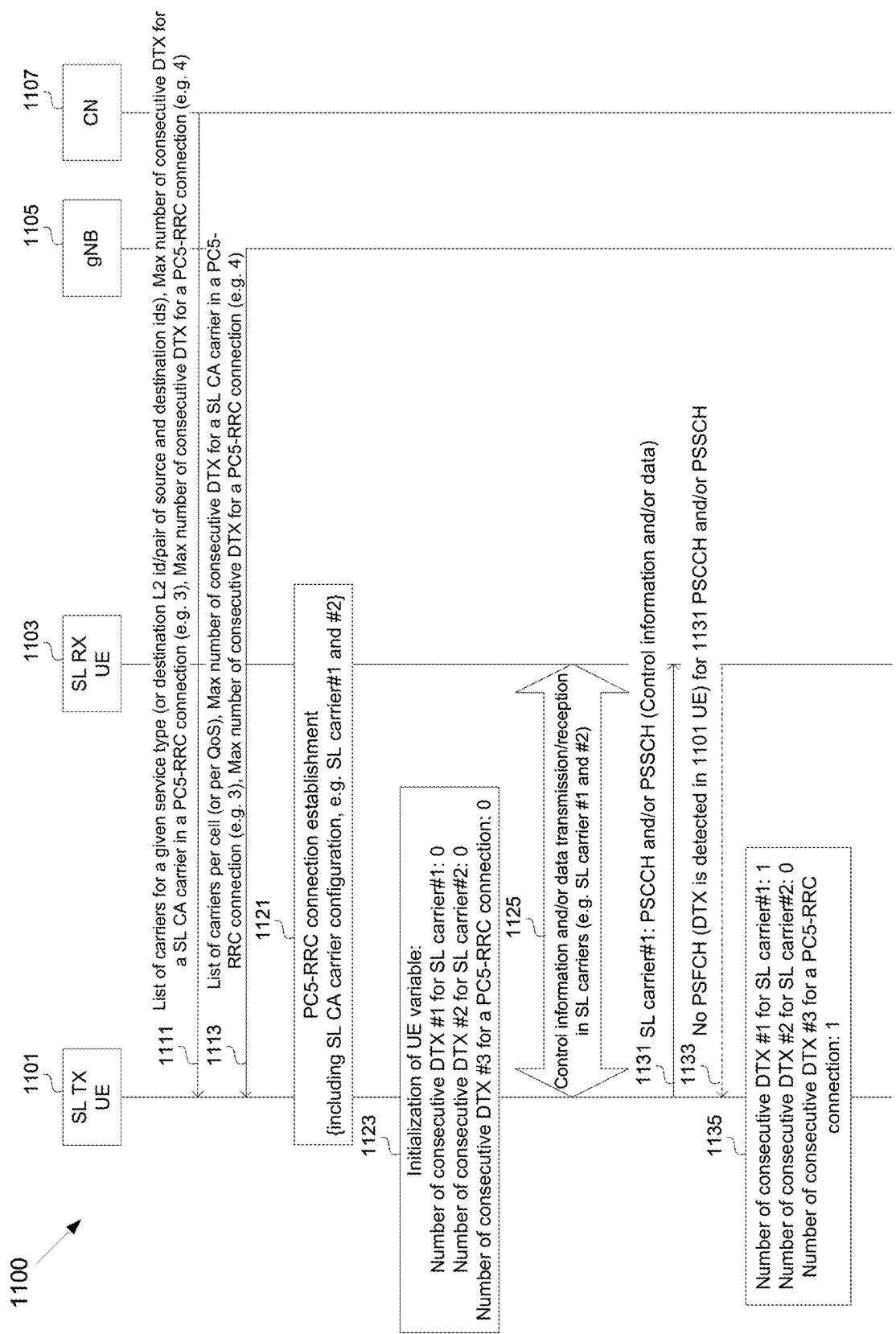
FIGS. 11A and 11B illustrate another signaling flows for an HARQ-based SL RLF detection in SL CA according to embodiments of the present disclosure.
Figure 11B:
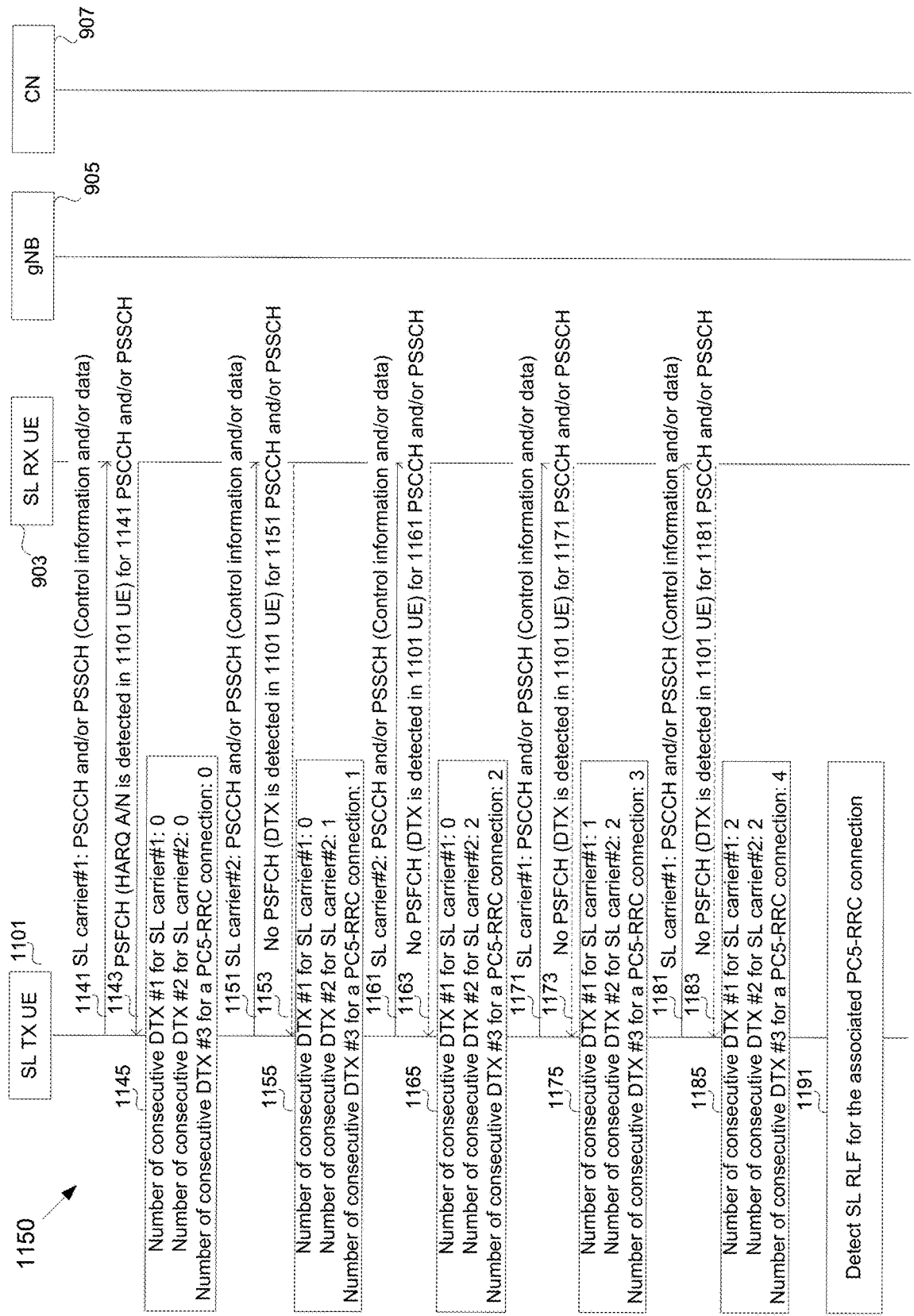

FIGS. 11A and 11B illustrate another signaling flows 1100 and 1150 for HARQ-based SL RLF detection in SL CA according to embodiments of the present disclosure. The signaling flows 1100 and 1150 as may be performed by a UE (e.g., 111-116 as illustrated in FIG. 1) and a base station (e.g., 101-103 as illustrated in FIG. 1). An embodiment of the signaling flows 1100 and 1150 shown in FIGS. 11A and 11B is for illustration only. One or more of the components illustrated in FIGS. 11A and 11B can be implemented in specialized circuitry configured to perform the noted functions or one or more of the components can be implemented by one or more processors executing instructions to perform the noted functions. FIG. 11A and FIG. 11B are connected together.

FIGS. 11A and 11B describe another example for the HARQ-based SL RLF detection in SL CA. An SL UE (1101) is configured for SL transmission, a peer SL UE (1103) is configured for SL reception, a serving gNB (1105) of the UE (1101), and a CN (1107) entity are charged for an SL pre-configuration. The CN 1107 pre-configures a list of SL carriers for a given service type (or a L2 destination id/a pair of source and destination ids), max number of consecutive DTX for a SL CA carrier in a PC5-RRC connection (hereafter it is called as max number #1), and max number of consecutive DTX for a PC5-RRC connection (hereafter it is called as max number #2) to the SL UE 1101 in 1111. The gNB (1105) configures available list of SL CA carriers in the serving cell (or list of SL CA carriers per QoS(s) in the serving cell), max number of consecutive DTX for a SL CA carrier in a PC5-RRC connection (hereafter it is called as max number #1), and max number of consecutive DTX for a PC5-RRC connection (hereafter it is called as max number #2) to the SL UE 1101 in 1113.

For max number #1 and max number #2 if the SL UE (1101) is located out of the gNB coverage, the UE applies pre-configuration from 1111 otherwise if the UE is located in the serving cell of the gNB, the UE applies configuration from 1113. For candidate SL CA carriers, if the SL UE (1101) is located out of the gNB coverage, the UE applies pre-configuration from 1111 according to the UE's interested service type (or a L2 destination id/a pair of source and destination ids) and possibly UE location otherwise if the UE is located in the serving cell of the gNB, the UE applies SL CA carriers that can be supported from both 1111 and 1113 according to the UE's interested service type (or a L2 destination id/a pair of source and destination ids). 1113 can be signaled by either a system information block or a UE dedicated RRC message.

One example of the UE dedicated RRC message is an RRCReconfiguration message defined in 3GPP standard specification. It may be assumed that max number #1 is pre-configured or configured to 3 and max number #2 is pre-configured or configured to 4 in 1111/1113. If the SL UE (1101) is interested in SL unicast (UC) communication with the SL UE (1103), a PC5-RRC connection establishment procedure is performed between the SL UE (1101) and SL UE (1103) in 1121. During PC5-RRC connection establishment, SL CA carriers that are actually used for SL transmissions and/or receptions between the two UEs can be also configured. It may be assumed that SL carrier #1 and #2 are configured as SL CA carriers. Note that SL CA carriers can be also configured by a separate SL RRC reconfiguration procedure after PC5-RRC connection is established.

The SL UE (1101) initializes UE variables once SL CA is configured/activated (1123). The UE maintains three variables of a number of consecutive DTX. First one is a number of consecutive DTX that is applied to SL carrier #1 (for an associated PC5-RRC connection), second one is a number of consecutive DTX that is applied to SL carrier #2 (for an associated PC5-RRC connection) and the third one is a number of consecutive DTX that is applied to a PC5-RRC connection. Note that it may be assumed that there is one PC5-RRC connection between the UEs (1101 and 1103). If there are multiple PC5-RRC connections between the UEs (1101 and 1103), the UE may need to maintain {3*a number of PC5-RRC connections} a number of consecutive DTX. The UE sets all three number of consecutive DTX as 0. The SL UEs (1101 and 1103) can send and/or receive SL control information and/or data over SL carrier #1 and SL carrier #2 (1125).

For example, the SL UE (1101) sends SL control information and/or data in PSCCH and/or PSSCH over SL carrier #1 (1131) and if the UE does not receive/detect HARQ Ack/Nack (A/N) (which is also expressed as DTX is detected) from the PSFCH resource associated to 1131 PSCCH and/or PSSCH (1133), the UE increments a number of consecutive DTX #1 for the scheduled SL carrier (in this case, it is SL carrier #1) and a number of consecutive DTX #3 for the scheduled PC5-RRC connection by 1 while UE does not change a number of consecutive DTX #2 for the other SL carrier (in this case, it is SL carrier #2) (1135).

As a result, a number of consecutive DTX #1 for SL carrier #1 and a number of consecutive DTX #3 for the PC5-connection are incremented to 1 and a number of consecutive DTX #2 for SL carrier #2 remains as 0. Then the UE sends SL control information and/or data in PSCCH and/or PSSCH over SL carrier #1 (1141) and if the UE receives/detect HARQ A/N from the PSFCH resource associated to 1141 PSCCH and/or PSSCH (1143), the UE re-initializes a number of consecutive DTX #1 for the scheduled SL carrier (in this case, it is SL carrier #1) and a number of consecutive DTX #3 for the scheduled PC5-RRC connection to 0 (1145).

As a result, a number consecutive DTX #1 for SL carrier #1, a number of consecutive DTX #2 for SL carrier #2 and a number of consecutive DTX #3 for the PC5-RRC connection are 0. Then the UE sends SL control information and/or data in PSCCH and/or PSSCH over SL carrier #2 (1151) and if the UE does not receive/detect HARQ Ack/Nack (A/N) (which is also expressed as DTX is detected) from the PSFCH resource associated to 1151 PSCCH and/or PSSCH (1153), the UE increments a number of consecutive DTX #2 for the scheduled SL carrier (in this case, it is SL carrier #2) and a number of consecutive DTX #3 for the scheduled PC5-RRC connection by 1 while UE does not change a number of consecutive DTX #1 for the other SL carrier (in this case, it is SL carrier #1) (1155).

As a result, a number of consecutive DTX #2 for SL carrier #2 and a number of consecutive DTX #3 for the PC5-connection are incremented to 1 and a number of consecutive DTX #1 for SL carrier #1 remains as 0. Then the UE sends SL control information and/or data in PSCCH and/or PSSCH over SL carrier #2 (1161) and if the UE does not receive/detect HARQ Ack/Nack (A/N) (which is also expressed as DTX is detected) from the PSFCH resource associated to 1161 PSCCH and/or PSSCH (1163), the UE increments a number of consecutive DTX #2 for the scheduled SL carrier (in this case, it is SL carrier #2) and a number of consecutive DTX #3 for the scheduled PC5-RRC connection by 1 while UE does not change a number of consecutive DTX #1 for the other SL carrier (in this case, it is SL carrier #1) (1165).

As a result, a number of consecutive DTX #2 for SL carrier #2 and a number of consecutive DTX #3 for the PC5-connection are incremented to 2 and a number of consecutive DTX #1 for SL carrier #1 remains as 0. Then the UE sends SL control information and/or data in PSCCH and/or PSSCH over SL carrier #1 (1171) and if the UE does not receive/detect HARQ Ack/Nack (A/N) (which is also expressed as DTX is detected) from the PSFCH resource associated to 1171 PSCCH and/or PSSCH (1173), the UE increments a number of consecutive DTX #1 for the scheduled SL carrier (in this case, it is SL carrier #1) and a number of consecutive DTX #3 for the scheduled PC5-RRC connection by 1 while UE does not change a number of consecutive DTX #2 for the other SL carrier (in this case, it is SL carrier #2) (1175).

As a result, a number of consecutive DTX #1 for SL carrier #1 is incremented to 1, a number of consecutive DTX #3 for the PC5-RRC connection is incremented to 3, and a number of consecutive DTX #2 for SL carrier #2 remains as 2. Then the UE sends SL control information and/or data in PSCCH and/or PSSCH over SL carrier #1 (1181) and if the UE does not receive/detect HARQ Ack/Nack (A/N) (which is also expressed as DTX is detected) from the PSFCH resource associated to 1181 PSCCH and/or PSSCH (1183), the UE increments a number of consecutive DTX #1 for the scheduled SL carrier (in this case, it is SL carrier #1) and a number of consecutive DTX #3 for the scheduled PC5-RRC connection by 1 while UE does not change a number of consecutive DTX #2 for the other SL carrier (in this case, it is SL carrier #2) (1185).

As a result, a number of consecutive DTX #1 for SL carrier #1 is incremented to 2, a number of consecutive DTX #3 for the PC5-RRC connection is incremented to 4, and a number of consecutive DTX #2 for SL carrier #2 remains as 2. Note that it may be assumed that max number #1 is pre-configured/configured to 3 and max number #2 is pre-configured/configured to 4 in 1111/1113. Since a number of consecutive DTX #3 (4) reaches to the pre-configured/configured max number #2 (4), the UE considers SL RLF is detected for the associated PC5-RRC connection (1191).

Once SL RLF is detected for the PC5-RRC connection, the UE's MAC sublayer indicates this SL RLF detection for the PC5-RRC connection (with information of the PC5-RRC connection, e.g., index of PC5-RRC connection, or the information of the corresponding destination, e.g., L2 destination id) to RRC sublayer. Then MAC performs for both SL carrier #1 and SL carrier #2, 1) release all reserved/configured resources associated to the PC5-RRC connection, 2) stops resource allocation associated to the PC5 connection, 3) flushes the soft buffers for all SL processes for all TB(s) associated to the PC5-RRC connection, 4) considers all Sidelink processes for all TB(s) associated to the PC5-RRC connection as unoccupied, 5) cancels triggered SL CSI Reporting procedure associated to the PC5-RRC connection (if any), 6) stops all timers associated to the PC5-RRC connection (if running) (including SL CA carrier specific timers associated to the PC5-RRC connection), and 7) resets all UE variables associated to the PC5-RRC connection (if any) (including SL CA carrier specific UE variables associated to the PC5-RRC connection, e.g., a number of consecutive DTX #1 and a number of consecutive DTX #2).

MAC also cancels triggered Scheduling Request procedure only associated to the PC5-RRC connection (if any) and cancels triggered sidelink buffer status reporting procedure only associated to the PC5-RRC connection (if any). Once RRC receives the SL RLF detection for the PC5-RRC connection from MAC, RRC performs 1) release the DRBs (Data Radio Bearer) of this destination if configured, 2) release the SRBs of this destination, 3) release the PC5 Relay RLC channels of this destination if configured, 4) discard the NR sidelink communication related configuration of this destination, 5) consider the PC5-RRC connection is released for the destination, 6) indicate the release of the PC5-RRC connection to the upper layers for this destination (i.e., PC5 is unavailable), and 7) indicate this SL RLF detection to the serving gNB by SidelinkUEInformation RRC message if the UE is in RRC connected.

In FIGS. 10A and 10B and FIGS. 11A and 11B, as another example, the pre-configured/configured max number #1 and max number #2 in 1011/1013 and 1111/1113 can be same value and in this case, single max number can be only signaled.

As another example, for the pre-configured/configured max number #1 and max number #2 in 1011/1013 and 1111/1113, instead of separate two integer values, one integer value and a kind of relative correlation information can be signaled. For example, max number #2 is signaled as 4 and scaling factor ½ is signaled, then the UE derives max number #1 as {4*½}=2. Or for example, max number #2 is signaled as 4 and relative offset −2 is signaled, then the UE derives max number #1 as {4−2}=2.

As another example, for the pre-configured/configured max number #1 in 1011/1013 and 1111/1113, instead of common single value for all SL CA carriers (e.g., max number #1 is applied to both SL carrier #1 and SL carrier #2), separate max number can be signaled per SL CA carrier(s). For example, list of max number #1 can be signaled, e.g., list of two max number #1s can be signaled and in the case, the UE uses the first max number #1 for SL detection in SL carrier #1 and the second max number #1 for SL detection in SL carrier #2. To do that, some mapping information between SL carriers and the corresponding max number #1 can be further configured in 1011/1013 and 1111/1113.

Figure 12:
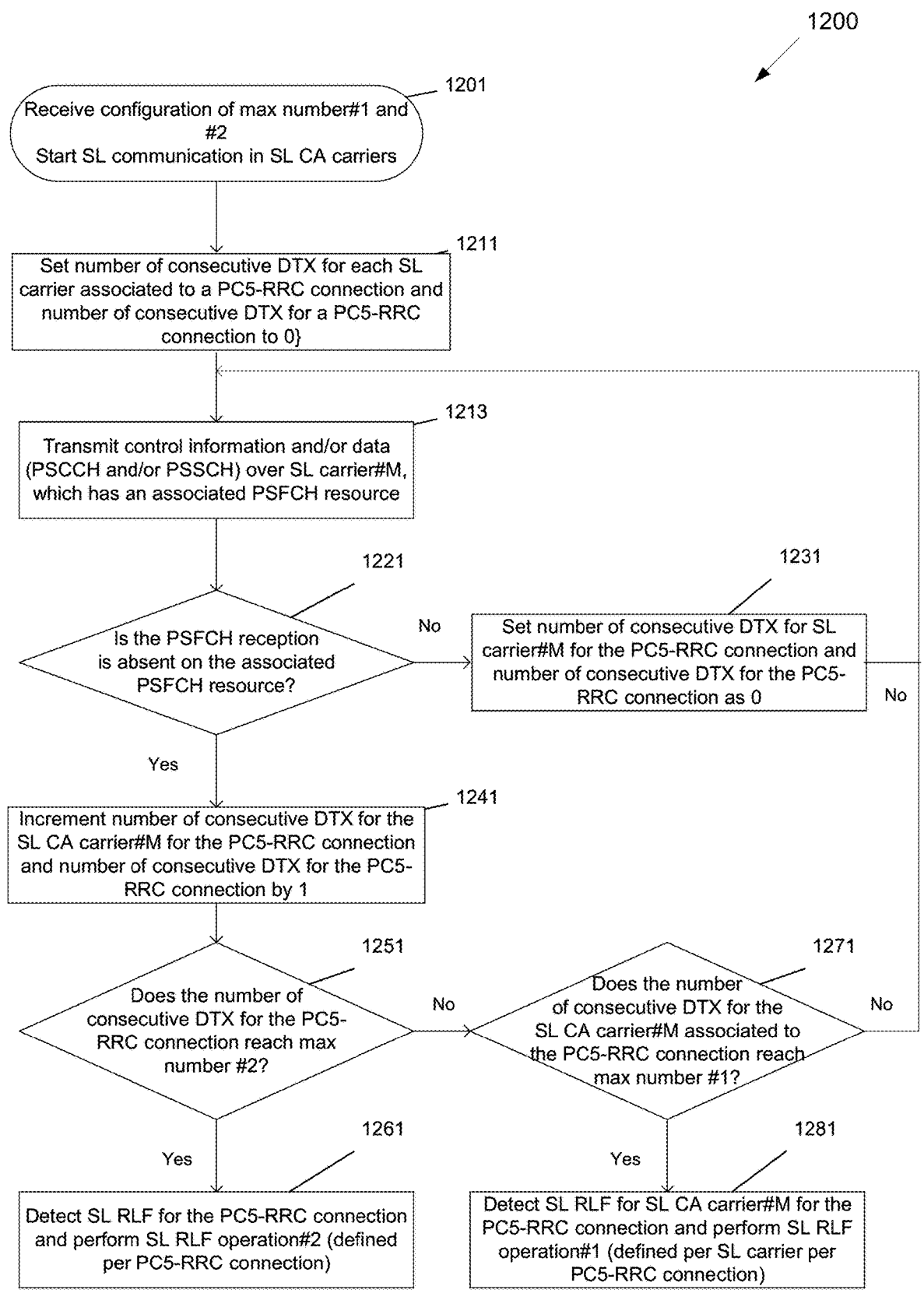
FIG. 12 illustrates a flowchart of method for UE according to embodiments of the present disclosure.

FIG. 12 illustrates a flowchart of method 1200 for UE according to embodiments of the present disclosure. The method 1200 as may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

FIG. 12 describes one example of the UE behaviors according to the embodiments described in FIGS. 10A and 10B and FIGS. 11A and 11B. 1201 shows that the UE receives configuration of max number #1 and max number #2 and starts SL transmission and/or receptions in multiple SL CA carriers. Then the UE initializes the related UE variables, i.e., a number of consecutive DTX for each SL CA carrier associated to a PC5-RRC connection and a number of consecutive DTX for a PC5-RRC connection, to 0 (1211). The UE transmits SL control information and/or data in PSCCH and/or PSSCH over SL carrier #M, which has an associated PSFCH resources for HARQ A/N information (1213). The UE checks if the PSFCH reception is absent (i.e., HARQ A/N is not detected/received or HARQ DTX is detected) on the PSFCH resource associated to the transmission in 1213 (1221). If the PSFCH reception is not absent (i.e., HARQ A/N is detected/received), the UE re-initializes a number of consecutive DTX for SL CA scheduled carrier (carrier #M) associated to the scheduled PC5-RRC connection and a number of consecutive DTX for the PC5-RRC connection to 0 (1231). If the PSFCH reception is absent, the UE increments a number of consecutive DTX for SL CA scheduled carrier (carrier #M) associated to the scheduled PC5-RRC connection and a number of consecutive DTX for the PC5-RRC connection by 1 (1241).

Then the UE checks if the number of consecutive DTX for the PC5-RRC connection reaches to max number #2 (1251). If the number of consecutive DTX for the PC5-RRC connection reaches to max number #2, the UE detects SL RLF for the PC5-RRC connection and performs SL RLF operation #2, which defined per PC5-RRC connection (1261).

An example of SL RLF operation #2 is what described as part of 1191 in FIGS. 11A and 11B. If the number of consecutive DTX for the PC5-RRC connection does not reach to max number #2, the UE further checks if the number of consecutive DTX for the SL CA carrier #M associated to the PC5-RRC connection reaches to max number #1 (1271). If the number of consecutive DTX for the SL CA carrier #M associated to the PC5-RRC connection reaches to max number #1, the UE detects SL RLF for SL CA carrier #M associated to the PC5 RRC connection and performs SL RLF operation #1, which defined per SL CA carrier per PC5-RRC connection (1281). An example of SL RLF operation #1 is what described as part of 1071 in FIGS. 10A and 10B.

Figure 13:
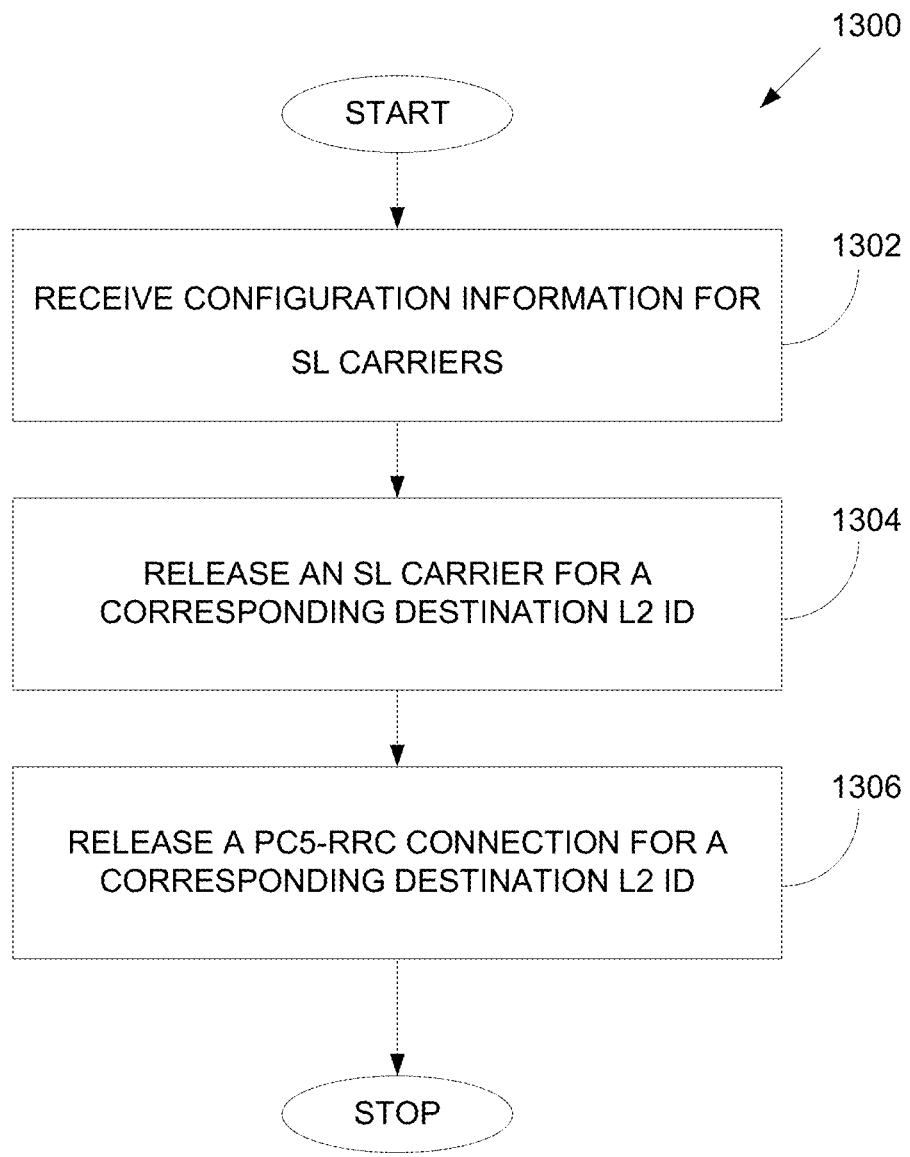
FIG. 13 illustrates a flowchart of a method for an UE operation upon RLF detection in a SL CA according to embodiments of the present disclosure.

FIG. 13 illustrates a flowchart of a method 1300 for an UE operation upon RLF detection in a SL CA according to embodiments of the present disclosure. The method 1300 as may be performed by a UE (e.g., 111-116 as illustrated in FIG. 1). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, the method 1300 begins at step 1302. In step 1302, a UE receives, from a BS, configuration information for multiple SL carriers for a SL CA operation.

In step 1304, the UE releases the SL carrier for a corresponding destination L2 ID when a HARQ feedback corresponding to the SL carrier among the multiple SL carriers is not received for consecutive N times and the SL carrier is not a last configured SL carrier.

In step 1306, the UE release a PC5-RRC connection for the corresponding destination L2 ID when the HARQ feedback corresponding to the SL carrier among the multiple SL carriers is not received for a consecutive M times and the SL carrier is the last configured SL carrier.

In one embodiment, the UE receives a value N and information for the multiple SL carriers via a UE dedicated RRC message or system information.

In one embodiment, the UE receives, via a UE dedicated RRC message or system information, a value M; and release the SL carrier based on a first counter and the PC5-RRC connection that is released based on a second counter, wherein: the first counter is compared against the value N, the first counter being configured per SL carrier; and the second counter is compared against the value M, the second counter corresponding to all SL carriers among the multiple SL carriers.

In one embodiment, the UE initiates a counter to count a number of the HARQ feedback not received; and resets the counter when the HARQ feedback is received before the counter reaches the value N, wherein: the value N is identical to a value M; and the counter corresponds to each SL carrier among the multiple SL carriers.

In one embodiment, the UE, when the SL carrier is released, flushes a soft-buffer for the corresponding destination L2 ID corresponding to TB s associated with the SL carrier; and cancels a SL CS reporting operation associated with the SL carrier.

In one embodiment, the UE transmits, to a base station via an RRC message or a MAC CE, information indicating that the SL carrier is released; or transmits, to a peer UE via the PC5-RRC connection or an SL MAC CE, the information indicating that the SL carrier is released.

In one embodiment, the UE increases the second counter by 1 when the HARQ feedback is not received by any SL carrier; and resets the second counter when the HARQ feedback is received by any SL carrier before the second counter reaches the value M.

In one embodiment, the UE determines a value of the second counter based on a summation of values of the first counter corresponding to all the SL carriers.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) comprising:
    a transceiver configured to receive, from a base station (BS), configuration information about multiple sidelink (SL) carriers for a SL carrier aggregation (CA) operation; and
    a processor operably coupled to the transceiver, the processor configured to:
        when a hybrid automatic repeat request (HARQ) feedback corresponding to a SL carrier among the multiple SL carriers is not received for consecutive N times and the SL carrier is not a last configured SL carrier, release the SL carrier for a corresponding destination layer 2 identifier (L2 ID); and
        when the HARQ feedback corresponding to the SL carrier among the multiple SL carriers is not received for consecutive M times and the SL carrier is the last configured SL carrier, release a PC5-radio resource control (PC5-RRC) connection for the corresponding destination L2 ID.

2. The UE of claim 1, wherein the transceiver is further configured to receive, via a UE dedicated RRC message or system information, a value for N and information for the multiple SL carriers.

3. The UE of claim 2, wherein:
    the value for N is identical to a value for M;
    the processor is further configured to:
        initiate a counter to count a number of the HARQ feedback not received, and
        reset the counter when the HARQ feedback is received before the counter reaches the value for N; and the counter corresponds to each SL carrier among the multiple SL carriers.

4. The UE of claim 2, wherein:
the transceiver is further configured to receive, via a UE dedicated RRC message or system information, a value for M; and
the processor is further configured to:
determine to release the SL carrier based on comparison of a first counter to the value for N, the first counter being configured per SL carrier, and
determine to release the PC5-RRC connection that based on comparison of a second counter to the value for M, the second counter corresponding to all SL carriers among the multiple SL carriers.

5. The UE of claim 4, wherein the processor is further configured to:
increase the second counter by 1 when the HARQ feedback is not received on any SL carrier among the multiple SL carriers; and
reset the second counter when the HARQ feedback is received by any SL carrier among the multiple SL carriers before the second counter reaches the value for M.

6. The UE of claim 4, wherein the processor is further configured to determine a value of the second counter based on a summation of values of the first counter corresponding to all the SL carriers among the multiple SL carriers.

7. The UE of claim 1, wherein, when the SL carrier is released, the processor is further configured to:
flush a soft-buffer for the corresponding destination L2 ID corresponding to transport blocks (TB s) associated with the SL carrier; and
cancel a SL channel status information (CSI) reporting operation associated with the SL carrier.

8. The UE of claim 1, wherein the transceiver is further configured to:
transmit, to a base station via an RRC message or a medium access control-control element (MAC CE), information indicating that the SL carrier is released; or
transmit, to a peer UE via the PC5-RRC connection or an SL MAC CE, the information indicating that the SL carrier is released.

9. A method performed by a user equipment (UE), the method comprising:
receiving, from a base station (BS), configuration information about multiple sidelink (SL) carriers for a SL carrier aggregation (CA) operation;
when a hybrid automatic repeat request (HARQ) feedback corresponding to a SL carrier among the multiple SL carriers is not received for consecutive N times and the SL carrier is not a last configured SL carrier, releasing the SL carrier for a corresponding destination layer 2 identifier (L2 ID); and
when the HARQ feedback corresponding to the SL carrier among the multiple SL carriers is not received for consecutive M times and the SL carrier is the last configured SL carrier, releasing a PC5-radio resource control (PC5-RRC) connection for the corresponding destination L2 ID.

10. The method of claim 9, further comprising receiving a value for N and information for the multiple SL carriers via a UE dedicated RRC message or system information.

11. The method of claim 10, wherein the value for N is identical to a value for M, the method further comprising:
initiating a counter to count a number of the HARQ feedback not received; and
resetting the counter when the HARQ feedback is received before the counter reaches the value for N, wherein the counter corresponds to each SL carrier among the multiple SL carriers.

12. The method of claim 10, further comprising:
receiving, via a UE dedicated RRC message or system information, a value for M;
determining to release the SL carrier based on comparison of a first counter to the value for N, the first counter being configured per SL carrier; and
determining to release the PC5-RRC connection that based on comparison of a second counter to the value for M, the second counter corresponding to all SL carriers among the multiple SL carriers.

13. The method of claim 12, further comprising:
increasing the second counter by 1 when the HARQ feedback is not received on any SL carrier among the multiple SL carriers; and
resetting the second counter when the HARQ feedback is received by any SL carrier among the multiple SL carriers before the second counter reaches the value for M.

14. The method of claim 12, further comprising determining a value of the second counter based on a summation of values of the first counter corresponding to all the SL carriers among the multiple SL carriers.

15. The method of claim 9, wherein, when the SL carrier is released, the method further includes:
flushing a soft-buffer for the corresponding destination L2 ID corresponding to transport blocks (TB s) associated with the SL carrier; and
canceling a SL channel status information (CSI) reporting operation associated with the SL carrier.

16. The method of claim 9, further comprising:
transmitting, to a base station via an RRC message or a medium access control-control element (MAC CE), information indicating that the SL carrier is released; or
transmitting, to a peer UE via the PC5-RRC connection or an SL MAC CE, the information indicating that the SL carrier is released.

17. A base station (BS) comprising:
a processor configured to generate configuration information for multiple sidelink (SL) carrier; and
a transceiver operably coupled to the processor, the transceiver configured to transmit, to a user equipment (UE), the configuration information for a SL carrier aggregation (CA) operation,
wherein:
when a hybrid automatic repeat request (HARQ) feedback corresponding to a SL carrier among the multiple SL carriers is not received for consecutive N times and the SL carrier is not a last configured SL carrier, the SL carrier for a corresponding destination layer 2 identifier (L2 ID) is released; and
when the HARQ feedback corresponding to the SL carrier among the multiple SL carriers is not received for a consecutive M times and the SL carrier is the last configured SL carrier, a PC5-radio resource control (PC5-RRC) connection for the corresponding destination L2 ID is released.

18. The BS of claim 17, wherein the transceiver is further configured to transmit a value for N and information for the multiple SL carriers via a UE dedicated RRC message or system information.

19. The BS of claim 18, wherein the transceiver is further configured to transmit, to the UE via a UE dedicated RRC message or system information, a value for M.

20. The BS of claim 19, wherein the transceiver is further configured to receive, from the UE via an RRC message or a medium access control-control element (MAC CE), information indicating that the SL carrier is released, and wherein the value for N is identical to the value for M.

* * * * *